United States Patent [19]

Southard

[11] Patent Number: 4,611,320
[45] Date of Patent: Sep. 9, 1986

[54] PROGRAMMABLE TESTING ANALYZER

[75] Inventor: Gary Southard, Coral Springs, Fla.

[73] Assignee: Siemens Corporate Research and Support, Inc., Iselin, N.J.

[21] Appl. No.: 612,206

[22] Filed: May 21, 1984

[51] Int. Cl.[4] .............................. H04J 1/16; H04J 3/14
[52] U.S. Cl. ........................................ 370/13; 370/17; 370/15
[58] Field of Search ...................... 370/13, 14, 15, 16, 370/58, 85; 179/175.2 D

[56] References Cited

U.S. PATENT DOCUMENTS

| 4,037,054 | 7/1977 | Neufang | 370/13 |
| 4,260,859 | 4/1981 | Aaroen | 370/13 |
| 4,535,453 | 8/1985 | Rhodes et al. | 370/58 |

OTHER PUBLICATIONS

Cohn-Sfetcu et al, "Automatic Transmission Tester for a Digital Telephone Exchange", IEEE International Conference on Communications, Boston, MA (Jun. 10-14, 79).

Colton, John R., "A New System Handles Cross-Connections", Telephony, Dec. 8, 1980.

Primary Examiner—Douglas W. Olms
Assistant Examiner—Wellington Chin
Attorney, Agent, or Firm—Thomas H. Jackson

[57] ABSTRACT

The invention relates to a transmission testing arrangement for executing performance tests for a telecommunication system which includes a central switch to the common control unit, a switching network, and line interface units internally connected to the switching network and adapted for connection to a corresponding line circuit. The testing arrangement includes a bus-oriented microprocessor system for synthesizing and analyzing test signals, a program memory, a main memory, and first and second interface modules.

27 Claims, 30 Drawing Figures

FIG. 6
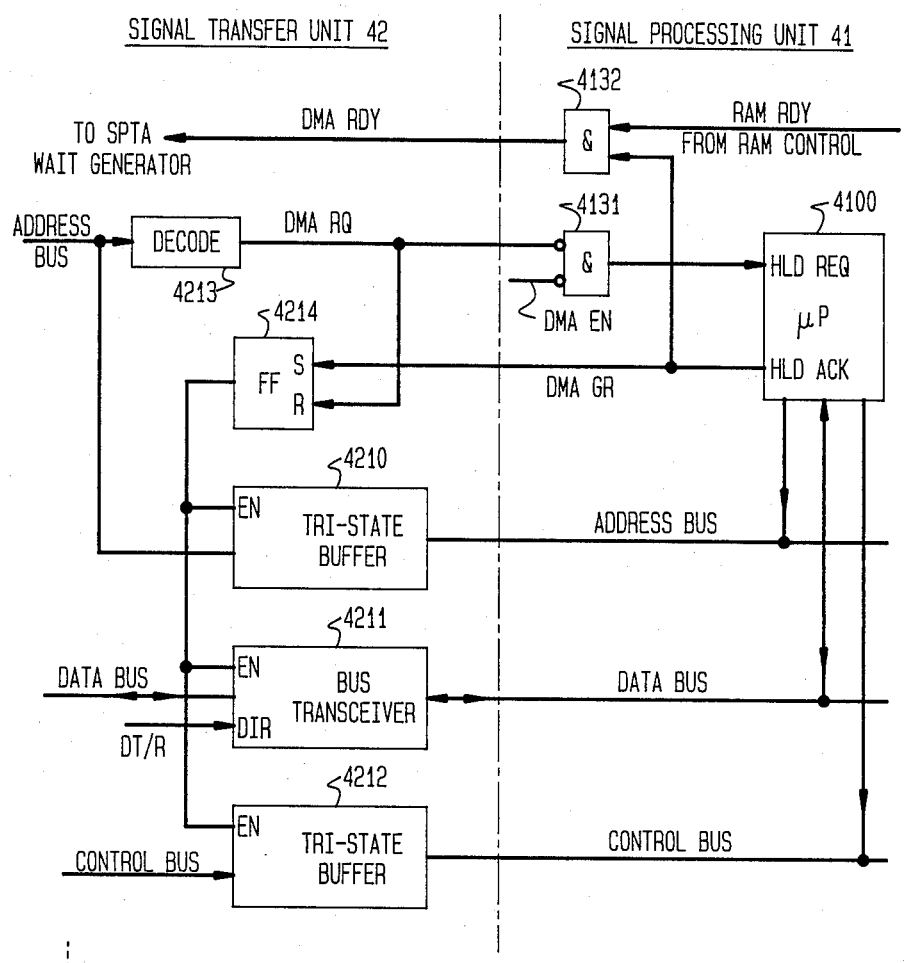
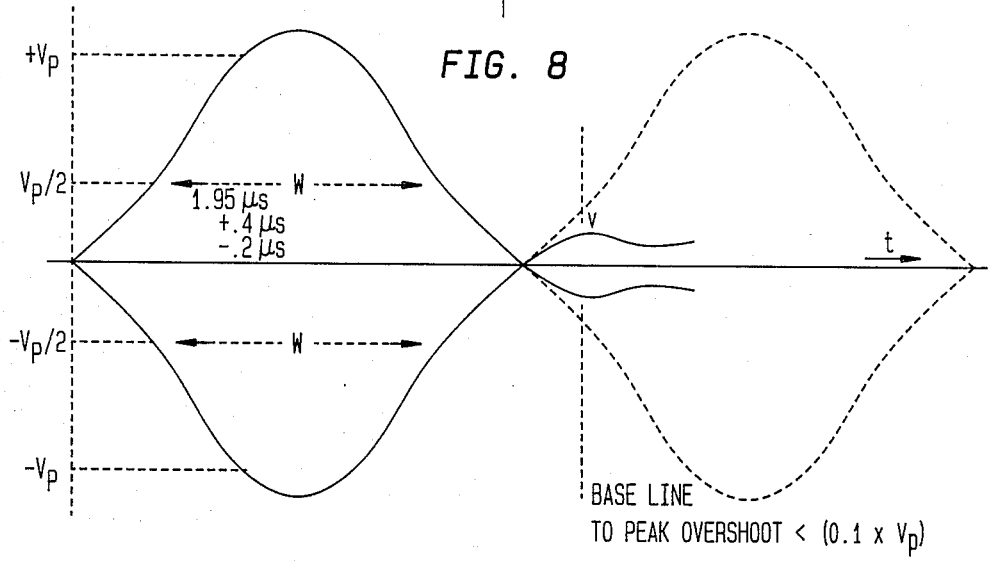
FIG. 8

TESTA

INPUT

FIG. 29

FCELL

| |
|---|
| LOAD LINEAR SAMPLE FROM INPUT BUFFER |
| SIGN MULTIPLY BY GAIN K. RESULT HAS 18 FRACTIONAL BITS |
| TRUNCATE TO 11 FRACTIONALS ROUNDED OFF, 12 INTEGERS<br>EXTEND SIGN 9 BITS LEFT<br>PUT 32 BIT FIGURE IN ACCUMULATOR |
| LOAD $\mu_1$ VALUE IN SCRATCH PAD |
| GET $\mu_1$ VALUE AND COEFFICIENT $-b_1$ |
| FMULT |
| MULTIPLY RESULT BY 2 AND ADD TO ACCUMULATOR |
| GET $\mu_2$ VALUE AND COEFFICIENT $-b_2$ |
| FMULT (32 x 16 SIGNED MULTIPLICATION) |
| ADD RESULT TO ACCUMULATOR |
| MOVE ACCUMULATOR TO MEMORY $Z^{-1}$ |

PROGRAMMABLE TESTING ANALYZER

BACKGROUND OF THE INVENTION

The invention relates to digital telecommunication systems and more particularly to a transmission testing arrangement for use with such a telecommunication system.

Digital telecommunication systems known in the art provide for temporary communication links between selected ones of a multitude of peripheral devices, such as subscriber stations under control of a central switch. Preferably, the central switch is of modular structure establishing different control levels. Transmission lines to peripheral devices and possibly other switches are grouped together and connected to a respective one of sub-units of the switch, the so-called line trunk groups. Each line trunk group is a control device designed for establishing information transfer along the transmission lines connected thereto through respective subscriber line module interfaces. Cross-connections between transmission lines associated with one of the same line trunk group are directly established under control of such line trunk group by means of an integral part of it, a group switching network. Cross-connections between transmission lines belonging to different line trunk groups are achieved by means of a central switching network having input/output ports connected to a respective one of the line trunk groups.

A common control unit is provided in the central switch for controlling all switching operations under real-time conditions, especially when the operation of different modules of the central switch is utilized. The common control unit is constructed of a programmable processor system having also input/output units residing together with a central processor on a system bus and being designed for transferring control information to and from the described modules of the central switch.

It is one characteristic of pulse code modulated (PCM) switching systems, in contrast to former analog switching systems, that information transfer is no longer achieved by means of physically through-connected lines rather than by applying time division methods, whereby the conditions on the analog subscriber lines are successively sampled and formatted into data words, so-called code words. These code words are arranged in a pulse frame together with control information. The pulse frame is processed word by word by the central switch is synchronism with a time frame of the system. This approach necessitates a great deal of synchronization among the different modules of the switch and a close control in order to assure the desired fail-safe operation. Consequently, even more than with a conventional switch, measures have to be taken that any malfunction of parts or modules of the telecommunication system is recognized even before failures become evident to a user or subscriber of the system.

A variety of stand-alone testing equipment is known which comprises tools used by maintenance personnel for measuring transmission characteristics or monitoring the performance of a telecommunication system. Conventionally, such testing equipment used to be of analog design. By this time, it became more and more sophisticated and was replaced by digital hardware structures with processing capability. However, such testing equipment is of less concern with respect to the present invention. The present invention, rather more, is directed to a self-testing arrangement which can easily be tailored to the needs of a specific digital telecommunication system and may be even made a built-in feature. Insofar, such self-testing facility is not directly a substitute for the testing equipment mentioned above, it is rather an additional means designed to facilitate routine tests automatically initiated by common control in order to monitor the performance of the telecommunication system and its various sub-units.

The complexity of a large digital telecommunication system including the central switch and the amount of inter-action and cooperation of various sub-units creates the need for extensive self-testing. This could be also achieved by a design where the transmission and switching modules include sophisticated internal fault detection in hardware. However, this approach is very costly and it is, therefore, assumed that most of those modules do not provide for such a hardware facility. Instead common control includes a scheduler of the central processor which is designed to initiate various tests periodically. The results of such tests give an overview of the performance of the entire system and may demand some automatic reconfiguration by taking redundant parts of the system out of service in case of a suspected or even actual malfunction. Only then, maintenance personnel will take action to further investigate the operation of such a module or device and to physically replace it, if necessary.

SUMMARY OF THE INVENTION

Therefore, there is a need for testing facilities being made an internal part of the telecommunication system and allowing for automatic tests. It is, therefore, a general object of the present invention to provide for such a testing means which is capable of running performance tests automatically initiated by common control of the central switch.

It is another object of the present invention to provide for such a testing means which is suitable for substituting of internal fault detection arrangements of various sub-units of the telecommunication system.

Another object of the present invention is to provide a testing arrangement which is capable of communicating with selected ones of peripheral devices, such as subscriber stations when performing a test and of analyzing response data received from the device under test in order to verify the current operating condition of the device under test.

It is still another object of the present invention to provide such a testing means having data processing capabilities and being designed to perform transmission and switching tests under software control.

A further object of the present invention is to provide a testing means designed in accordance with a special processing language of high level which supports the hardware structure of the testing arrangement and allows the testing means to be utilized by testing and maintenance personnel as a "black box", thus enabling for a variety of tests to be defined without hardware changes or additions to an installed telecommunication system.

These and other objects, which will become apparent in the discussion that follows, are achieved according to the present invention by a transmission test arrangement for use with a digital telecommunication system as described above, wherein this test arrangement is designed for executing performance tests on devices of the telecommunication system and incorporates a bus-oriented microprocessor system designed for synthesizing and analyzing test signals and including a processor bus, and residing on the same a microprocessor, a program memory, a main memory and first and second interface modules. The first interface module is connected to receive test control information specifying a test procedure and to transmit test results. The main memory and the program memory are designed for storing intermediate data and control information for executing a test, respectively. The second interface module is connected to a selected one of the line interface units for simulating an information source and sink, respectively with respect to one of the devices of the telecommunication system which device is temporarily linked to said selected line interface unit across the switching network under control of the common control unit.

This test arrangement constitutes a programmable facility which is connected to the telecommunication system like any one of peripheral units, such as subscriber stations etc. and communicates with the system, or makes use of the system's devices in a corresponding manner. This approach allows tests to be initiated by the same switching routine of the system which are used by other peripheral devices. The general concept is to establish temporary communication paths within the central switch and to selected peripheral devices in a manner typical for the system in order to provide for configurations which are demanded for a given test. The only difference to a normal connection may be that the transmission test arrangement while performing a test transmits a certain test message and expects to have it returned or to receive a corresponding response in order to evaluate the operation of certain devices by analyzing the returned data. In this case a remote peripheral has to be provided for a loop-back operation.

From the system's point of view a test does not necessarily interfere with its overall operation, i.e. tests can be run whenever it is desired, however, extensive testing will preferably not be done during high traffic times. The test arrangement provides a general transmission test facility including a digital signal synthesizer and processor. This facility supports system maintenance.

Most transmission and switching modules do not provide internal fault detection in hardware but rely on software tests. Software cannot actually check transmission parameters, however, it can provide a crude measure of performance. For example, a group processor in a line trunk group could verify that a tone generator designed to supply all call processing tones is generating "tones" at its output. But the group processor cannot during real-time determine if those tones meet requirements. The transmission testing arrangement provides a means for such measurements. Other transmission tests require a signal source as well as an analyzer. All tests of line and trunk circuits belong to this group of tests.

A transmission test arrangement designed in accordance with the present invention provides primary testing and fault detection, among others, for five main types of modules of the telecommunication system.

It can provide transmission tests of lines or trunks. A line or trunk to be tested is placed in loop-back mode before the test command is issued to the testing arrangement accompanied by a parameter indicating an attenuation value. If attenuation is not required, the value will equal zero. The testing arrangement will then synthesize a tone (or tones) which pass through the device under test and back to the testing arrangement. The testing arrangement then analyzes the returned signal for adequate transmission quality. The quality is essentially determined by the amplitude of the returned signal for each passband or stopband point tested.

Also code receivers can be tested. For code receiver tests the testing arrangement synthesizes a burst (or bursts) of tones containing one or more frequencies. The response from the respective line trunk group containing the target receiver under test is monitored and a pass/fail status is determined.

Another test target may be a digital tone generator designed for generating call processing tone signals. A tone generator is tested on command one tone channel at a time. The test checks for power spectral content at the frequencies expected and additionally in case of a tone cadence, i.e. a pulse with predetermined "on" and "off" time intervals for correct timing.

The testing arrangement allows for time slot tests. In this case, the test target, a time slot, is put into a loop-back mode, i.e. it "listens to itself". After establishment of the connection, the testing arrangement will send either tones or code patterns through the established path which is looped back to the source of data where the response is analyzed. The test arrangement in this case, is employed as synthesizer and signal analyzer.

Furthermore, also conference facilities can be checked, if the telecommunication system is equipped with such features. A conference feature may be implemented by a linear summation circuit. It requires the incoming companded PCM signals (A law) to be converted to linear codes before accurate PCM signal summation can be performed by the conference circuit. The correct operation of such a circuit is tested by sending three different PCM signals to the linear summation circuit. Two signals are supplied by the testing arrangement while the third is derived from a tone generator. The conference circuit is checked for correct summation of the signals.

The conference feature can also be implemented by means of a combiner circuit where the conference circuit broadcasts the selected speaker's PCM samples to the conference attendees. Such conference scheme is tested similarly using companded PCM signals but with different test criteria based on an active speaker algorithm. By either one of those implementations conference tones are supplied which are analyzed by the testing arrangement.

The application of the testing arrangement in accordance with the present invention is not limited to the different uses outlined above mostly for the purpose of illustration of the flexibility of this approach. In general, it is a signal synthesizer which is capable of generating any frequency sinusoid up to 4 KHz with power level from $-60$ dbm to $+3.1$ dbm, for example. The starting phase can also be specified. Internal representation before A-law companding is a minimum of 12 bits plus a sign bit to represent the 4096 decision levels possible with the encoding law. Any combination of those frequencies can be supplied. This programmable approach allows for generating pulsed tones or combination of tones to simulate DTMF digits or other specialized signals. The pulse envelopes have specified rise and fall times, i.e. a linear ramp. Pulse widths are settable in specified increments. The allowable sum of all digit pulses in a test may be a maximum of 1 second which allows complete testing of a DTMF receiver with 16 valid digits and at least 5 invalid digits. Signal synthesis may include furnishing of a sequence of all possible 256

PCM code words to allow a complete and compact check of attenuation or a translation ROM in peripheral circuits.

Signal analysis, on the other hand, may incorporate signal processing functions, such as digital filtering including bandpass, low pass, high pass, and notch. Filters are described to the testing arrangement by coefficients based on parameters of frequency and bandwidth. Also RMS power measurements can be implemented with results generated in dbm, or loss measurements with results expressed in db. Such measurements can be at any specific frequency.

Idle channel noise can be measured. Envelope analysis will include measurement of the period of tone pulses, duty cycle, and rise and fall times of pulse edges. Among others, comparison of pass/fail and conditional pass parameters from the test array to measured values can be employed.

The flexibility of the testing arrangement is not only illustrated by its different applications but also by different uses as a stand-alone device adapted to be connected to a digital telecommunication system and as a built-in, integral part of such a system, respectively. Common control of such a system is usually a bus-oriented processing system including a system bus and input/output processing modules connected thereto and forming sub-systems of common control. In accordance with a preferred embodiment of the invention, the first interface module of the testing arrangement may be an interface unit connected to the system bus whereby the transmission testing arrangement constitutes just another sub-system of common control. In this case a task scheduler of common control can be utilized to set-up selected tests automatically and periodically, preferably during low traffic hours in order to avoid undue burden on the system. A major advantage, in general but also especially for such use, is that the structure of the testing arrangement wherein tests are defined by software eliminates influences of altering components which are a significant restraint for the use of analog measurement equipment which has to be readjusted frequently.

In accordance with another preferred embodiment of the invention the microprocessor system of the transmission testing arrangement includes storage means in the form of buffers of predetermined but variable length utilized for intermediately storing of signal patterns in a manner corresponding to real-time processing conditions of said telecommunication system, whereby each buffer length reflects an actual time period based upon the assumption that a buffer is filled and emptied, respectively during the execution of a test byte-by-byte with the sampling rate of the telecommunication system.

This buffer concept allows for specifying certain time intervals for executing a test and simulates a time pattern controlling the progress of a test routine. This may be illustrated by some applications of such buffers. Assuming that a certain test requires a tone or tone pattern to be transmitted to a device under test. Prior to actually executing the test under real-time conditions, the tone pattern specified by certain parameters, such as frequency, tone level and length will be synthesized in form of a sequence of samples in accordance with the sampling rate of the telecommunication system. These consecutive samples are intermediately stored in subsequent storage locations of a memory area defined as an output buffer associated with this specific test. Only after the completion of signal synthesis the test is actually executed by transmitting the established sequence of samples in real-time to the device under test. Similarly, if the test requires a corresponding response from the device under test the returned samples received by the transmission testing arrangement under real-time conditions are stored in subsequent storage locations of another buffer specified for this test such that after the completion of data transfer an exact replica of the signal pattern received is available for signal analysis.

This concept has, among others, two consequences. Signal synthesis and signal analysis which may be extensive calculation routines can be performed off-line and only the actual data transfers are executed under real-time conditions. It is apparent that this approach allows a microprocessor system to be utilized for signal synthesis and signal analysis, respectively which may be less powerful than a processor system designed for executing such tasks under real-time constraints. On the other hand, such concept adds to the flexibility of the testing arrangement. The structure and organization allows for specifying buffers of any length within the limits of the hardware; it allows for generating various tone patterns by defining the contents of such buffers only by means of certain parameters mentioned above. Based upon this buffer concept any conceivable tone pattern, which can be defined by means of the given parameters, can be made a basis for a test without hardware or firmware redesign of the transmission testing arrangement.

BRIEF DESCRIPTION OF THE DRAWINGS

A better understanding of the invention may be had by reference to the following detailed description and to the accompanying drawings, in which:

FIG. 6 is a block diagram of an interface network arranged for processing information transfers between both subunits of the PCM transmission analyzer;

FIG. 8 is a wave form diagram representing an alternate mark inverted (AMI) pulse, i.e. the actual signal wave form representing PCM test data utilized by the signal transfer unit for transmission of data to peripheral devices;

FIG. 29 shows a flow chart illustrating a subroutine for filter calculation and representing a filter cell of the filter shown in FIG. 28.

DETAILED DESCRIPTION

It is one characteristic of pulse code modulated (PCM) time division switching networks that digital technology and software or firmware control is utilized to any possible extent, and analog modules or devices are only provided where absolutely necessary for communication with an analog "outside world", i.e. the periphery of the telecommunication system, such as conventional analog subscriber stations and other analog terminals. With this understanding, it is apparent that any peripherals can be directly connected to such a switching network if they comprise a digital interface which is implemented in accordance with the transmission protocol of the switching network. Consequently, digital and analog peripherals may be connected to such a network at the same time.

It is just another step in the same direction that the control of such digital switching networks relies heavily on software and to some extent, were necessary because of stringent time conditions, on firmware. One consequence of this design concept is that many transmission and switching modules of such a digital telecommunication system do not provide internal fault detection in hardware but depend upon software tests. It is not an easy task to actually measure transmission parameters by means of software but at least a measurement of performance can be provided under software control with reasonable efforts.

Figure 1:
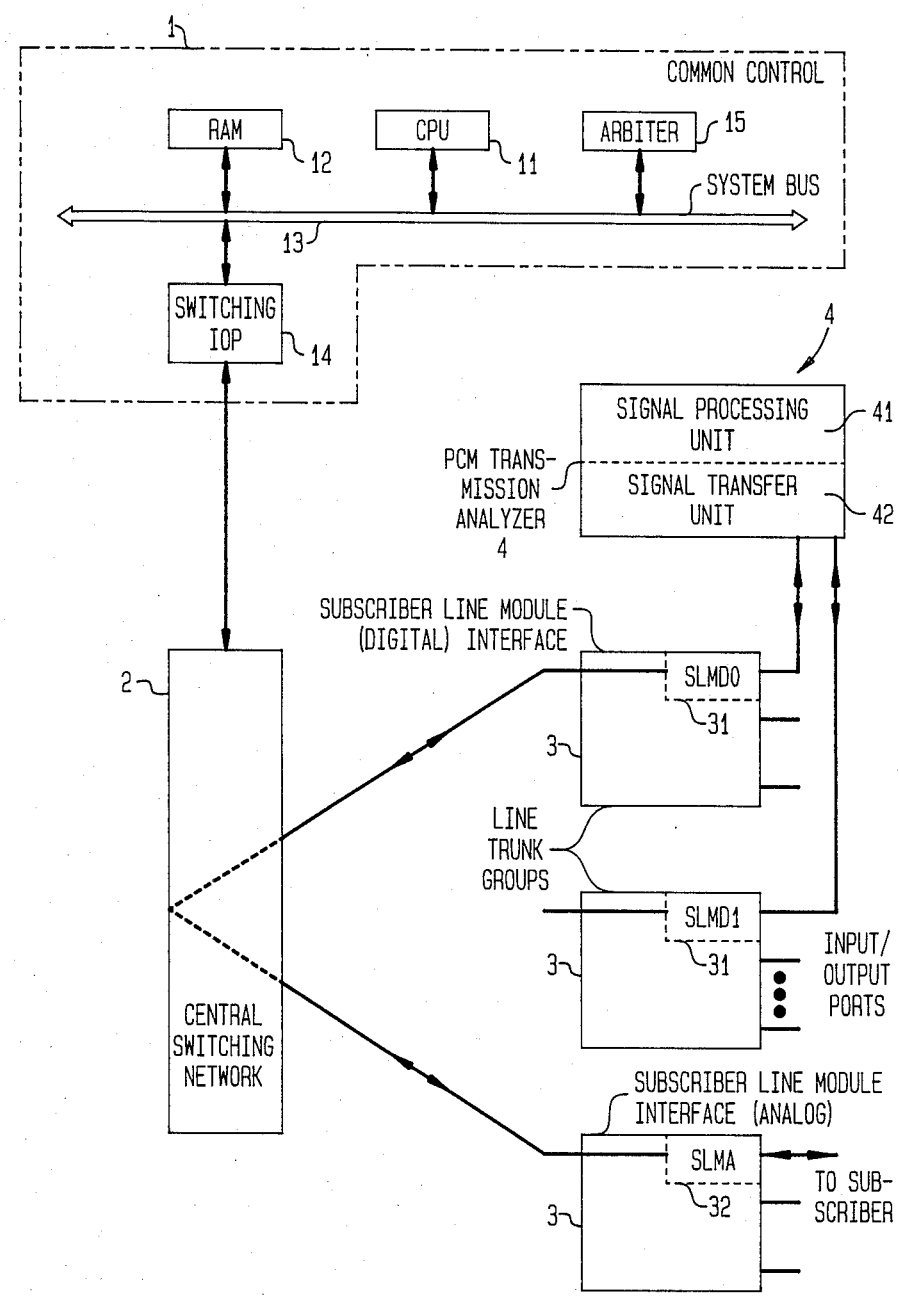
FIG. 1 represents a basic block diagram of the central switch of a digital telecommunication system including a common control and a PCM transmission analyzer forming an independent subsystem of the common control.

FIG. 1 represents a block diagram which illustrates schematically the main sections of a switching network of a digital telecommunication system including a PCM transmission analyzer which comprises a general transmission test facility for such a digital telecommunication system. The main sections of the central switch are represented in FIG. 1 by a common control 1, a central switching network 2 and a plurality of line trunk groups 3. The common control constitutes the main control unit of the central switch. It is a programmable unit which includes a central processor 11 connected to its own working memory 12 across a system bus 13. Other units may reside on this bus such as a switching input/output processor 14 which is a slave of the central processor 11 and constitutes a specialized processor for controlling the central switching network 2. If many modules share the use of the system bus 13 it is desirable to relieve the central processor 11 from the task of controlling access to this bus and a bus arbiter 15 is provided for this purpose.

It may be noted that the line trunk groups 3 adapted to be connected to a plurality of subscriber lines or trunks by means of input/output ports may constitute a second level of switching control. In this case, they form local control units for all connect, switching and release operations within the group of transmission paths connected to their respective input/output ports. To this reason, a line trunk group includes a group processor, group switching network and a plurality of line trunk units. Each line trunk unit, in turn, is associated with a respective subgroup of the transmission paths controlled by this line trunk group. For simplification, in the block diagram of FIG. 1 neither the group processor, the group switching network, line trunk units nor respective control connections with the common control 1 are shown. Only subscriber line module interfaces 31 and 32, respectively are depicted which devices represent a part of a respective line trunk unit and comprise input/output links to connected transmission paths. In accordance with the design objectives outlined above such subscriber line module interfaces may comprise a digital-to-digital interface such as the interfaces 31 referenced SMLD0 and SLMD1, respectively or a digital-to-analog interface 32 referenced SLMA.

The outlined structure of the digital telecommunication network is conventional, it is therefore described just to an extent which is desirable for a better understanding of the present invention.

PCM Transmission Analyzer Objectives

The PCM transmission analyzer 4 designed to provide a general transmission test facility, from the system's point of view, is an independent subsystem residing on the central system bus 13. The transmission analyzer 4 includes two units, a signal processing unit 41 constituting a digital signal synthesizer and analyzer, and a signal transfer unit 42 which functions as a PCM data input/output handler transmitting and receiving data to and/or from the telecommunication system via either one of the digital subscriber line module interfaces 31. The signal processor unit 41 and the signal transfer unit 42 each are microprocessor controlled devices and communicate by direct memory access.

This transmission analyzer is designed to verify performance of all line and trunk circuits if equipped with loop-back, of tone generators, of code receivers by providing code tones, of conference bridges or combiners, and of any other transmission path associated with the digital switch. The PCM transmission analyzer 4 periodically tests all applicable circuits automatically under control of the common control 1, and if a man/machine interface is provided for the digital switch, even tests may be generated which are initiated manually. If a test requires it, transmission test results can be returned to the requesting party.

For starting of tests the common control 1 is equipped with a periodic test scheduler which is a software routine for initiating tests of the PCM transmission analyzer. Additionally, the common control 1 supports the PCM transmission analyzer 4 by providing various other central control functions. The common control 1 seizes a device for test and places it in a testing state. It sets up a transmission path from the PCM transmission analyzer 4 to a device under test. This path can be randomly or specifically selected according to the test requirements.

It provides means for aborting or by-passing a test of elements which are in a temporary disabled state or are currently disconnected or are made inaccessible for testing.

It schedules the PCM transmission analyzer 4 to perform self-testing to ensure that it is in proper operation state. Such tests will include tests on both the signal processing unit 41 and the signal transfer unit 42.

It controls down-loading of a test array specifying the test and containing device if the transmission analzer is not implemented to store all test arrays in its own memory space.

FIG. 1 illustrates schematically this concept. The PCM transmission analyzer 4 resides on the system bus 13 of the common control 1 and its signal transfer unit 42 is connected to two digital subscriber line module interfaces 31 constituting, from the system's point of view, the connection links to the transmission paths temporarily established by the common control 1 for performing a specified test. Such a test transmission path is schematically indicated; the digital subscriber line module interface SLMD0 is connected across the central switching network 2 to a corresponding analog subscriber line module interface SLMA possibly arranged in the same or alternatively in any other line trunk group 3. For example, if a subscriber station is connected to the subscriber line module interface SLMA, loop-back mode is required for transmission path tests.

In general, the PCM transmission analyzer 4 is designed to provide primary testing and fault detection for five main types of switching network modules: digital tone generators generating all processing tones, code receivers for DTMF or MFC tones, lines and trunks, conference bridges and combiners, and the switching network.

A digital tone generator of a digital telecommunication system is a device which is programmed to generate all call processing tones in form of pulse code modulated signals supplied to a tone highway in form of a pulse frame. The PCM transmission analyzer 4 is designed to test such a tone generator on command one channel at a time. The test checks for power spectral content at the frequencies expected, and a cadence for correct timing.

For code receiver tests the PCM transmission analyzer synthesizes a burst or bursts of tones containing one or more frequencies. Because of other testing facilities available in the telecommunication system the test can be performed such that the system maintenance monitors the response from the line trunk group 3 containing the receiver under test in order to determine a pass or fail status.

For test on the performance of lines or trunks, the respective element to be tested is placed in loop-back mode before the test command is issued to the PCM transmission analyzer 4. The test command is accompanied by parameters indicating an attenuation value of the line. If attenuation is not required, the value will equal zero. The PCM transmission analyzer 4 synthesizes a tone or tones which pass through the device under test and back to the test subsystem. The PCM transmission analyzer then analyzes the returned signal for adequate transmission quality. The quality is essentially determined by the amplitude of the returned signal for each passband or stopband point tested.

The switching system may include conference features such as a linear summation conference bridge, or a combiner conference bridge with direct inputs without linear summation, or a large conference feature constituting a combination of both. The linear summation conference bridge requires the imcoming companded PCM signals be converted to linear codes before accurate PCM signal summation can be performed by the conference circuit. A combiner conference bridge broadcasts the selected speaker's PCM samples to the conference attendees.

A test of the first conference feature is performed by sending three different PCM signals to the linear summation circuit. Two signals are supplied by the PCM transmission analyzer 4 while the third signal is derived from a tone generator. The conference circuit is then checked for correct summation of the supplied signals. The other conference scheme is tested similarly by utilizing companded PCM signals but with different test criteria based upon an active speaker algorithm. Both conference features provide conference tones which are returned to and analyzed by the PCM transmission analyzer 4.

Time slot tests of the switching network are conducted by putting the target time slot in a "listen to itself" or loop-back mode. After the connection across the transmission path is established the PCM transmission analyzer 4 will send either tones or code patterns through the path looped back to the PCM transmission analyzer where fault analysis is accomplished.

In summary, the PCM transmission analyzer 4 can function as a signal source only, as indicated with respect to a possible implementation of code receiver tests, as a signal process only as is the case with respect to digital tone generator tests, or can combine both functions, for transmission loss measurements, for example. The functions of synthesis and analysis can be considered separately.

As far as signal synthesis is concerned any frequencey sinusoid of up to 4 KHz with power level from $-60$ dbm to $+3.1$ dbm shall be supplied. The starting phase may also be specified. Internal representation before A-law companding is a minimum of 12 bits plus sign to represent the 4096 decision levels possible with this encoding law. The synthesizer shall be capable of generating any combination of such frequencies having a peak power which is less than $+3.1$ dbm.

The PCM transmission analyzer shall also be designed to generate pulsed tones or combinations of tones in order to simulate DTMF digits or other specialized signals. The pulse envelopes have 4 millisecond rise and fall times with a linear ramp. Pulse widths are settable in 4 millisecond increments. The allowable sum of all digit pulses in a test is a maximum of 1 second which allows complete testing of a dual tone multifrequency (DTMF) receiver with 16 valid digits and at least 5 invalid digits. Furthermore, the PCM transmission analyzer 4 should be designed for generating a sequence of all possible 256 PCM code words to allow a complete and compact check of attenuation or translation memories in peripheral circuits. For signal synthesis it may be mentioned that both conventional companding laws, i.e. A-law and MU-law companding may be implemented by respective firmware adjustments.

On the other hand, signal analysis will include a variety of signal processing functions. Such functions include digital filtering by means of bandpass, low pass, high pass and notch filters. Such filters are described to the PCM transmission analyzer 4 by coefficients based on the parameters of frequency and bandwidth.

Power measurements are based upon root mean square (RMS) calculation on returned signals with results generated in the mean power level (dbm). Loss measurements are expressed in db, such measurements can be at any specific frequency.

Signal analysis may include idle channel noise measurement. Envelope analysis includes the period of tone pulses, duty cycle, and rise and fall times of pulse edges. The PCM transmission analyzer 4 is required to be capable of analyzing a string of such pulses which may vary in width, spacing and frequency.

Signal analysis may comprise a comparison of pass-/fail and conditional pass parameters specified specified in the respective test array to the actually measured values. Such comparisons include a comparison of input buffers to reference buffers on a byte by byte basis. This capability is used in conjunction with the generation of the 256 byte series to completely check translation memories in transmission equipment. In fact, such a test requires no real signal processing but a simple comparison and is rapid therefore.

To this respect it may be noted that a variety of tests do not have to be performed under real time requirements. Whereas it is possible to implement a testing facility capable of high speed and real time testing, it is understood that off-line operation offers a possibility for more extensive use of software control and is therefore easier to implement with a higher degree of flexibility. It is a design choice, whether control should be essentially exercised by firmware or software and whether test analysis should be performed in real time in an on-line mode or by means of a testing facility operating on buffers which represent time segments, to be described later in more detail.

Figure 2:
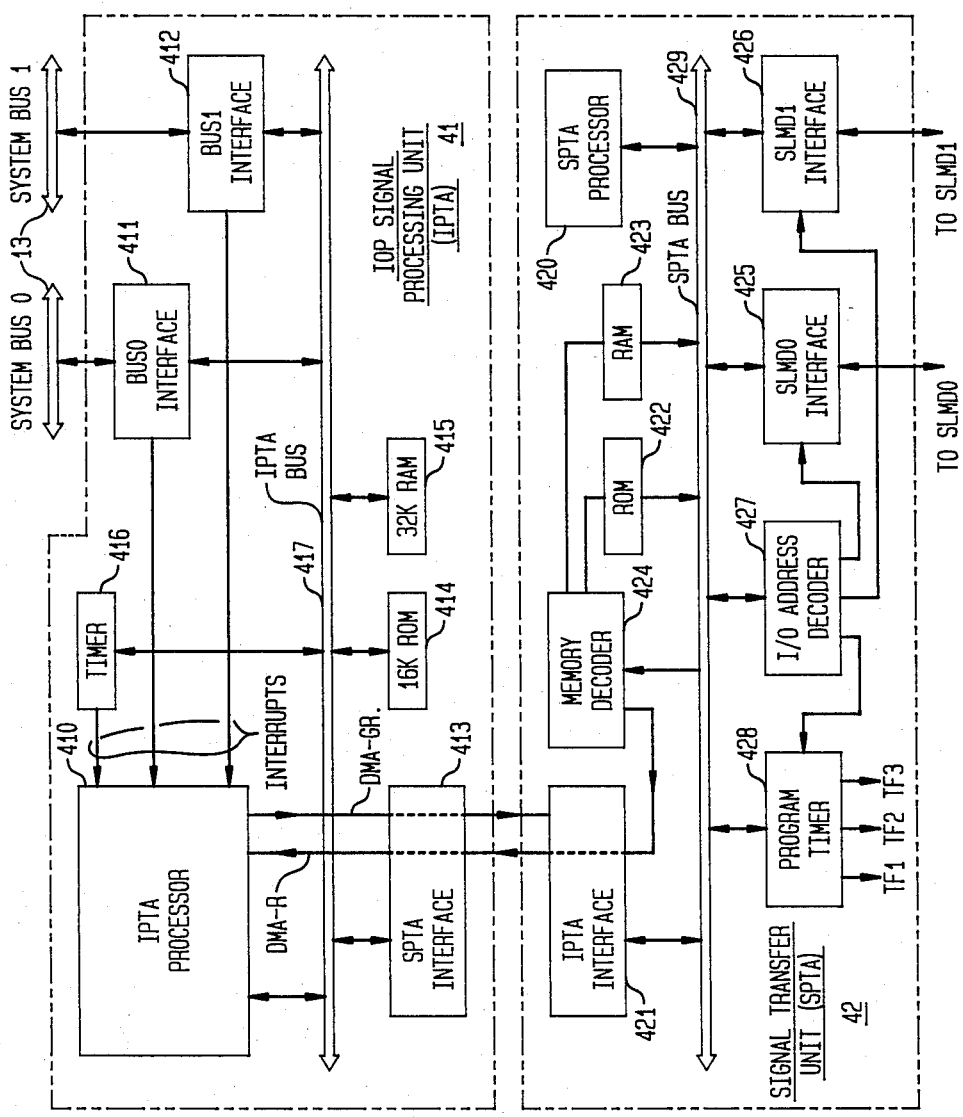
FIG. 2 represents a block diagram of the PCM transmission analyzer being composed of two microprocessor controlled subunits, an input/output processor IOP signal processing unit and a signal transfer unit.

The structure of the PCM transmission analyzer 4 is depicted in more detail in FIG. 2 representing a block diagram of this subsystem. Both units 41 and 42 of the PCM transmission analyzer 4 constitute a separate microprocessor system based upon a minimum mode 8086 microprocessor system manufactured by Intel. The manufacturer provides various material such as data manuals, application notes, etc. for this widely known microprocessor system such that detailed description of the microprocessor system as such is deemed to be necessary only to an extent which is desirable for a full understanding of the present system applications.

FIG. 2 show the main functional blocks of the IOP signal processing unit (IPTA) 41 with an IPTA processor 410, two equivalent central system bus interfaces 411 and 412 adapted to be connected, as schematically illustrated, to the redundant system bus 0 and system bus 1, respectively representing the central system bus 13. The IOP signal processing unit 41 includes an interface unit to the signal transfer unit 42, the SPTA interface 413, a read only program memory 414 and a dynamic random access main memory 415. For timing control a timer 416 is provided which may be implemented by Intel circuit 8253. All these devices reside on a commmon microprocessor bus, the IPTA bus 417.

Similarly, the signal transfer unit (SPTA) 42 includes an SPTA processor 420, an IPTA interface unit 421 constituting the interface to the IOP signal processing unit 41, a read only program memory 422, a random access memory 423 and, a memory decoder 424 associated with both memory units. The signal transfer unit 42 further comprises two subscriber line module interface units 425 and 426, respectively each constituting a connection link to the line trunk groups 3, as illustrated in FIG. 1. As input/output address decoder 427 is associated with these interface units and is also connected to a program timer 428. Again, all the mentioned devices of the signal transfer unit 42 are residing on a common microprocessor bus system, the SPTA bus 429.

IOP Signal Processing Unit

Figure 3:
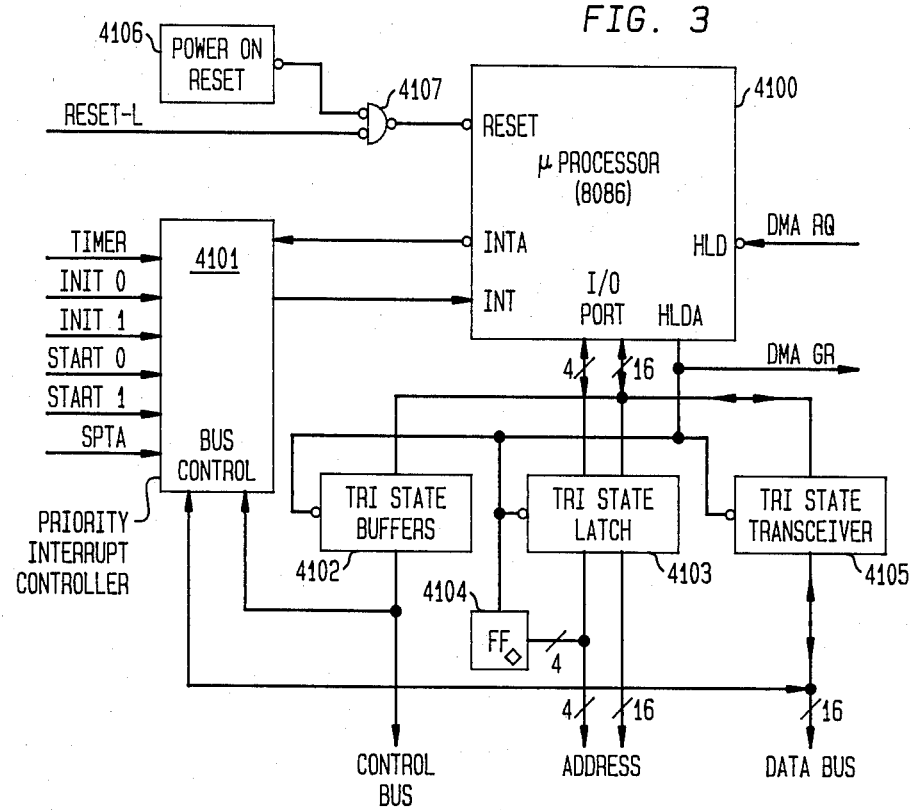
FIG. 3 is a block diagram of the microprocessor of the IOP signal processing unit.

The IPTA processor 410 of the IOP signal processing unit 41 is shown in more detail in FIG. 3. The processor circuit implemented by an 8086 microprocessor is referenced 4100. Interrupts are handled by a specialized priority interrupt controller 4101 which resolves the active interrupt of highest priority and generates a processor interrupt INT and a vector required by the 8086 microprocessor hardware. The interrupt controller may be implemented by Intel circuit 8259A, and reference should be made to the manufacturer's circuit description and application notes. All input/output information received or generated by the microprocessor 4100 is buffered by means of tri-state drivers. One tri-state buffer 4102 intermediately stores output control signals. A tri-state address latch 4103 is provided for buffering address signals. The lower 16 address bits are latched to a multiplexed address and data bus represented in FIG. 2 by the IPTA bus 417. The upper 4 address bits are used only to address the common control memory 12 across the system bus 13. These bits are held low whenever the signal transfer unit 42 performs data moves via direct memory access. Within the tri-state address latch 4106 separate tri-state drivers are provided which drive these four address bits to a low condition when the microprocessor 4100 releases the IPTA bus 417. At this time a control output HLDA of the microprocessor 4100 is high to indicate a high level data access state. This feature is illustrated in FIG. 3 by means of the tri-state driver 4104. Accordingly, a tri-state data transceiver unit 4105 is provided for temporarily buffering data to be received by or transmitted from the microprocessor 4100.

The processor unit has a reset circuit 4106 which provides a means to force the processor to a known state at power up. The circuit also prevents a reset service address generated by the microprocessor 4100 from initiating any request for the system bus 13. This service address is within the range normally decoded as a read or write operation to or from the system bus 13. An additional reset is received from the system bus interfaces 411 and 412 at corresponding inputs of an OR-GATE 4107 which is also connected to receive the output signal of the reset circuit 4106. The output of this OR-GATE provides eventually a reset input signal to the microprocessor 4100. The reset signals received from the system bus interfaces 411 and 412, respectively enable a hard reset of the IOP signal processing unit 41 in the event of failure conditions, as will be described in more detail.

Figure 4:
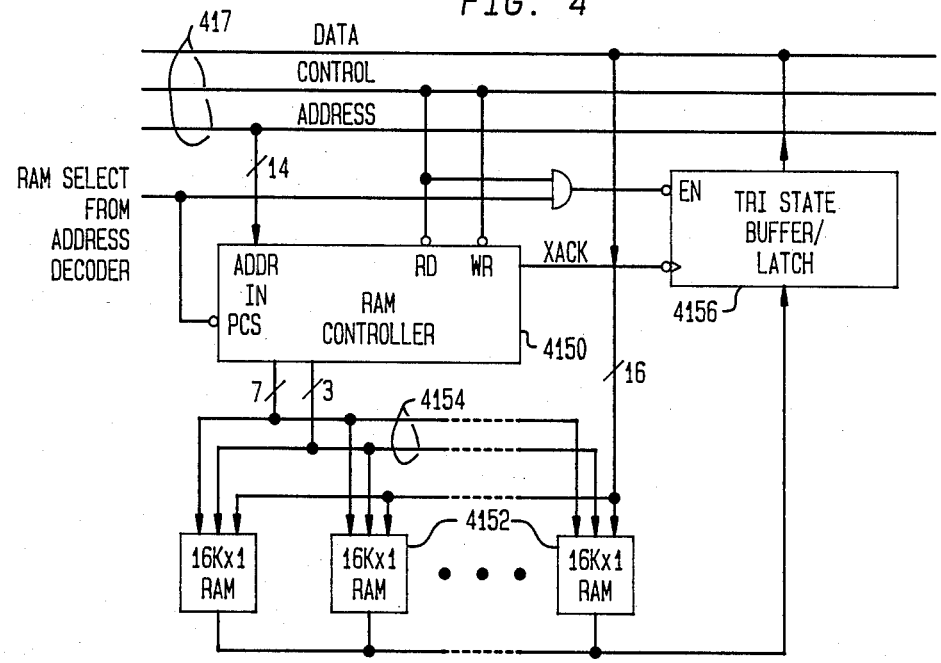
FIG. 4 is a block diagram of a main memory of the IOP signal processing unit.

The program store of the IOP signal processing unit is implemented as the ready only memory 414 which is organized in 8K words each 16 bits wide. The main memory is the random access read/write memory 415 of 32K byte memory capacity organized to contain 16K words each 16 bits wide. This memory is dynamic and requires refresh every two milliseconds to prevent loss of data. The structure of this read/write memory is shown in more detail in FIG. 4. A monolithic dynamic RAM controller 4150 is used to control refresh automatically and is implemented by a conventional 8202A circuit of Intel. The RAM controller operates on its own internal clock and periodically addresses the main memory circuits 4152 with background read (refresh) cycles. The 16 main memory circuits 4152 constituting the RAM memory 415 use a multiplexed address bus 4154 provided by the RAM controller 4150 along with the address strobes for column and row. In the event that a RAM address is placed on this address bus, the decoded address enables a protected chip select input PCS of the RAM controller 4150. When a read or write control signal is also present on the control bus constituting part of the IPTA bus 417, the RAM controller 4150 will initiate a memory cycle.

The RAM controller 4150 outputs the memory address in two parts, first a row address and then a column address. After the address is latched in the main memory, either a write stroke is sent thereto for a write cycle or a tri-state buffer latch 4156 is enabled onto the internal IPTA bus 417 for a read cycle. The latch is strobed by a transfer acknowledge signal XACK generated by the RAM controller 4150. This signal becomes active only after data is valid from the main memory 415.

As previously mentioned the IOP signal processing unit 41 has separate interface units 411 and 412 for each redundant bus of the central system bus 13. Each respective interface unit provides several functions. It constitutes a bidirectional bus transceiver connected to the data section (16 bits) of the system bus 13. It includes tri-state buffer latches for the address section of the system bus and tri-state buffers for the corresponding control bus. Furthermore, the interface provides decoding of the address selecting the IOP signal processing unit 41 and of several operational codes in the address field of the central system bus 13. The operational codes represent the means for communicating of the common control 1 with the PCM transmission analyzer 41 and the IOP signal processing unit 41, respectively. In response thereto a ready signal required for the handshaking procedure with the common control is generated.

Figure 5:
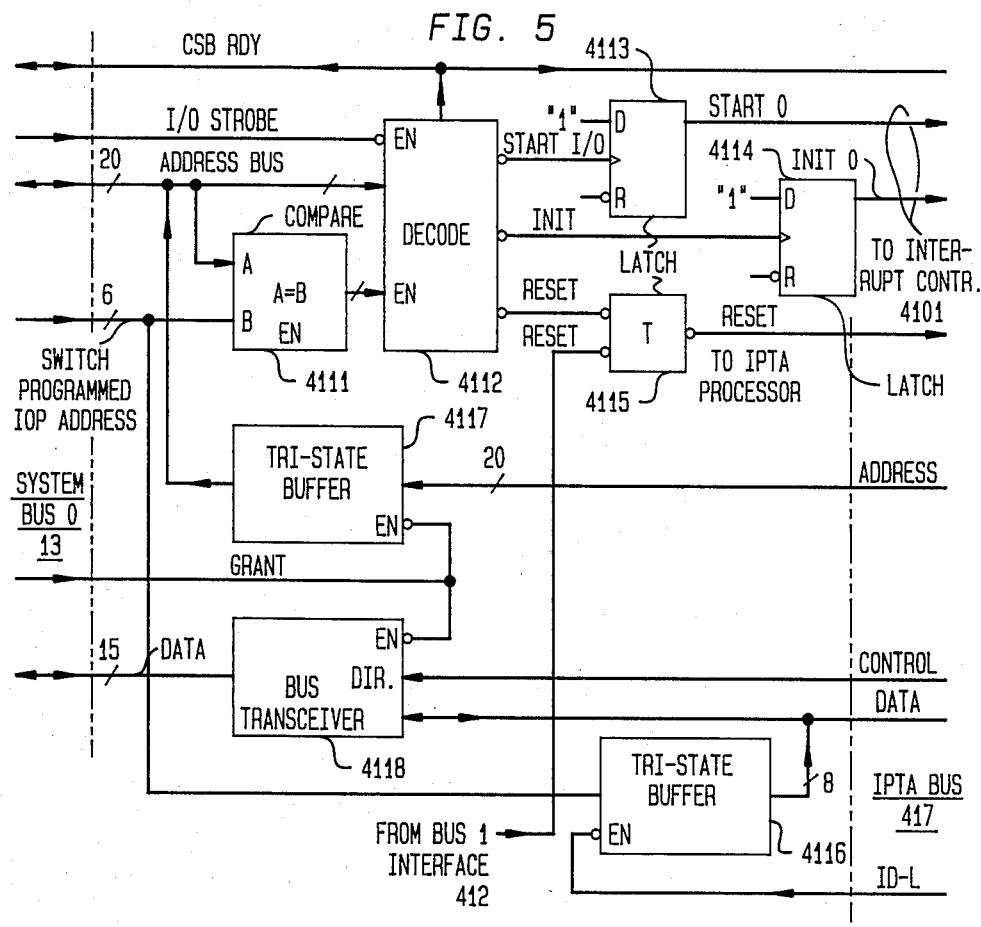
FIG. 5 is a block diagram of an interface unit designed for establishing a communication link between the IOP signal processing unit and the common control.

FIG. 5 represents a block diagram for the system bus interface unit 411, this interface unit is duplicated for the redundant branch of the system bus 13.

The system bus interface unit 411 includes a comparator 4111 connected to receive a transmission analyzer address from the central system bus 13 at first inputs A and a switch programmed subsystem address at second inputs B. Upon identity of both addresses an enable signal is generated at the output of comparator 4111 and furnished to a control input of a decoder 4112. This decoder is connected to receive an input/output strobe for valid data from the system bus 13 and several address bits which comprise the operational code for routines, such as initialization INIT, the start of an input/output operation START I/O and for a reset RESET. The first two mentioned operational codes cause corresponding control signals to be furnished at outputs of the decoder 4112 which signals are buffered in latches 4113 and 4114, respectively. These latches, in turn, generate interrupts supplied to the priority interrupt controller 4101 of the IPTA processor 410. Each interrupt is cleared by a specific input/output operation.

FIG. 5 shows a control line CSBRDY which carries an open collector signal driven by either the IOP signal processing unit 41 or the common control 1 depending on the originator of a transaction across the system bus 13. Any reset, initialization routine or start of an input/output will cause the IOP signal processing unit 41 to drive this control line low. For DMA operations, the common control 1 drives this control signal low. To this regard, it may be noted that the decoder 4112 supplies a reset control signal. This signal is linked to a corresponding control signal generated by the second bus interface unit 412 by means of an OR-gate 4115 which furnishes the reset signal described in conjunction with FIG. 3.

Finally, the system bus interface unit 411 includes the respective tri-state buffers for address and data transfer to and from the system bus 13. There is provided one tri-state buffer 4116 connected to receive the switch programmed IOP address and having outputs connected to the data section of the IPTA bus 417. This tri-state buffer is enabled by means of a control signal ID-L received from a local input/output port of the IPTA processor 410 and controlling the access to the data section of IPTA bus 417.

A second tri-state buffer 4117 is connected to receive an address from the address section of the IPTA bus 417 and has corresponding outputs connected to the respective address section of the system bus 13. A bus transceiver unit 4118 is provided for bidirectional data transfers between the data sections of the system bus 13 and the IPTA data bus section. This transceiver receives a direction control signal supplied by the control section of the IPTA bus 417 and an enable signal which is also supplied to the tri-state buffer 4117 and constitutes a grant signal for the system bus 13. Requests for the system bus 13 are generated by the address decoding circuitry when any memory address above 64K is decoded or any input/output address above 32K is decoded. This assumes that the bus selector signals enable the request for the bus.

FIG. 6 represents the interface circuitry provided for transfers between the IOP signal processing unit 41 and the signal transfer unit 42, in other words it illustrates both the SPTA interface unit 413 and the corresponding IPTA interface unit 421. The internal buses of the IOP signal processing unit 41 and the signal transfer unit 42 are connected via tri-state buffers 4210 through 4212. When the signal transfer unit 42 addresses the IPTA memory 415 which is treated as a common memory, a DMA request signal is generated by an address decoder 4213 of the IPTA interface unit 421. This request signal is logically linked by an AND gate 4131 to a DMA enable signal DMAEN generated by the IPTA processor 410 and furnished across the local input/output port. The AND gate 4131 outputs a hold request signal to the processing unit 4100 of the IPTA processor 410 (see FIG. 3).

When the IPTA processor 410 can release the bus, it sends a DMA grant signal DMAGR to the signal transfer unit 42. Simultaneously, it sets the tri-state mode for all address, data and control buses, except for the upper four address bits which are forced to zero, as described previously. This is necessary since the address section of the SPTA bus 429 is only 16 bit wide in contrast to the 20 bits of the respective section of the IPTA bus 417. The DMA grant signal DMAGR enables the tri-state drivers and transceivers provided in the IPTA interface unit 421 by setting an enable flip-flop 4214 having an output commonly connected to the respective enable inputs of the tri-state buffers and transceiver units 4210 through 4212 of the IPTA interface unit 421.

Thereupon, the signal transfer unit 42 proceeds with a normal memory cycle. The SPTA processor 420 is synchronized by a DMA ready control signal DMARDY which is an output signal of a further AND gate 4132 connected to receive the DMA grant signal and a memory ready signal which is supplied by the RAM controller 4150. The output signal of AND gate 4132 goes high when the address IPTA memory 415 is ready.

Signal Transfer Unit

The basic structure of the signal transfer unit 42 was described in conjunction with the block diagram represented in FIG. 2. It is apparent from this description that this unit of the PCM transmission analyzer 4 is a microprocessor controlled unit of a design structure quite similar to the IOP signal processing unit 41 already described in detail. The IPTA interface 421 of the signal transfer unit 42 has been described in detail in conjunction with FIG. 6 and it is, therefore, believed that further description of the signal transfer unit, in order to avoid undue reiteration, can be limited to modules especially characteristic for the signal transfer function of the PCM transmission analyzer 4.

One characteristic of the signal transfer unit 42 is the fact that it has a small program memory 422 and a main memory 423 on its own but shares a memory area in the IPTA main memory 415 with the IOP signal processing unit 41. Access to this common memory area is made in a DMA mode. To this reason, the memory decoder 424 is provided for decoding a memory address of the signal transfer unit 42. Whenever the memory address decoders to the DMA memory area, a DMA request by means of the control signal DMAR is sent to the IOP signal processing unit 41. A bus cycle is granted by means of the return control signal DMA GR and the signal transfer unit proceeds with a normal memory cycle. For further details reference should be made to the description of FIG. 6.

Another characteristic of the structure of the signal transfer unit 42 is the use of various peripheral devices which appear as input/output ports to the SPTA processor 420. These devices include the two subscriber line module interfaces 425 and 426, a priority interrupt controller (not shown in FIG. 2) which is associated with the 8086 microprocessor of the SPTA processor 420 in a manner corresponding to the one described for the IPTA processor 410 in conjunction with FIG. 3, and the program timer 420 for use of defined functions. The priority interrupt controller, forming a subsection of the SPTA processor 420 handles all interrupts to the microprocessor by putting them into a predetermined order of priority such that the microprocessor can execute each interrupt in a logical order similar to the one described in conjunction with the IPTA processor 410. It may be just mentioned that not all interrupt requests necessarily have to be treated as true hardware interrupts since all requests are readable by the 8086 microprocessor whether they are masked or not. The program timer 428 may be implemented by a integrated circuit #8253 manufactured by Intel and provides three output flags signals TF1 through TF3. These three timer output flags are assigned interrupt request lines as schematically illustrated in FIG. 2. Intel data catalog and user application notes may be consulted for details regarding programming of this device.

The transmit/receive circuitry for the two data channels represented by the subscriber line module interfaces 425 and 426, respectively run on a clock pulse train which is asynchronous with respect to the surrounding telecommunication system. Each transceiver arranged in the respective interface unit clocks in serial data from the connected digital subscriber line module 31 (see FIG. 1), converts the data into a parallel format and signals the programmable interrupt controller of the SPTA processor 420 that data is available for processing. In the other direction, the transceiver accepts parallel data from the SPTA bus 429 and shifts it out in serial format toward the connected digital subscriber line module 31.

Figure 7:
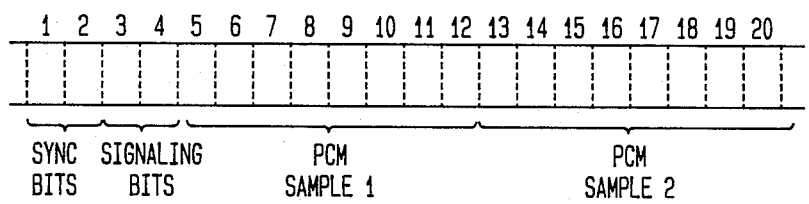
FIG. 7 represents a diagram illustrating the format of a digital telephone burst, i.e. the format of PCM test data transmitted from or received by the PCM transmission analyzer.

Each subscriber line module interface is a two-wire metallic connection with transformer isolation between the hardware of the signal transfer unit 42 and the metallic wire pair. Twenty bits of information are sent and received asynchronously at both interfaces within one 250 microsecond frame. The clock pulse rate, in accordance with the requirements of the telecommunication system, is 256 KHz within the frame. As illustrated in the burst format represented in FIG. 7, the 20 bit frame is comprised of two synchronization bits, two signalling bits which are not used by the PCM transmission analyzer 4 and two 8 bit PCM samples. The effective data rate is 64K bit/seconds since 16 bits of PCM data are bidirectionally transferred every 250 microseconds.

The signal transfer unit 42 transmits data using alternate mark inversion (AMI). A corresponding AMI pulse is represented in the wave form diagram of FIG. 8 where the horizontal axis is a time axis t. The transmitted AMI pulse is nominally 1.95 microseconds wide at 50% of the maximum voltage. The peak voltage Vp at the output of the transformer shall be 0.5 volt±20% into a 130 ohm resistive load. The signal transfer unit 42 can be adjusted to receive AMI pulses with a peak voltage ranging from 1.2 volt peak to 1.2 volt peak at a rate of 256 KHz. The receiver section uses a fixed threshold which is adjusted at manufacture.

The receiver hardware of the subscriber line module interface takes in the received AMI pulses and converts the same into a unipolar "return to zero" format. The return to zero pulses shall be not longer than 3.5 microseconds in width and not shorter than 1.5 microseconds in width. The subscriber line module interface synchronizes on the first positive going pulse of the received 20 bits and then shifts all 20 bits of the received data into a shift register which generates a parallel format. When 16 bits have been counted, an interrupt is created and furnished to the programmable interrupt controller of the SPTA processor 420. The actual interrupt is advanced four counts to reduce interrupt latency.

Following a burst reception, the signal transfer unit sends a 20 bit burst with the same format through the subscriber line module interface unit within the 250 microsecond frame constraint. During the transmission phase of data toward the connected subscriber line module 31, the receive hardware of the subscriber line module interface unit is disabled. The transmitted data is in the same format as the received data and clocked out at a 256 KHz rate. The actual hardware implementation of such a subscriber line module interface unit is conventional, follows all normal digital telecommunication system specifications and is that well known that a detailed hardware representation is deemed to be superfluous.

A High Level Signal Processing Language

In order to allow for universal use of the PCM transmission analyzer 4 the described hardware is supported by specially designed software. The general aim is that the PCM transmission analyzer be utilized as an independent subsystem of a digital telecommunication system, and that various tests can be programmed by testing and maintenance personnel who use this subsystem as a "black box" with certain testing characteristics.

In order to separate the internal structure of the PCM transmission analyzer 4 from actual test generation a high level signal processing language has been created which allows for a more natural description of a test by a transmission engineer. This language is composed of a set of sentences that require the assistance of a compiler to translate them into a data base, or test array, for implementation by the PCM transmission analyzer 4. The output of the compiler is a series of opcodes, operands and symbolic addresses which drive an interpreter associated with the PCM transmission analyzer 4.

By means of this high level language allows a test designer defines various buffers which represent PCM transmission time segments. The language allows these buffers to be filled with a synthesized sinusoid signal of specified amplitude, frequency, and phase thus determining tones or tone patterns which are transmitted to the telecommunication system. The language also allows input buffers to be created and filled with received PCM data. Transmission analysis is achieved through a series of opcodes defined by this language.

Figure 9:
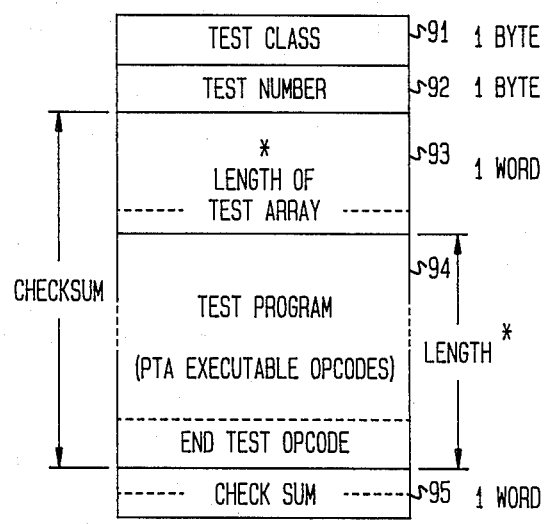
FIG. 9 is a diagram illustrating the basic structure of a test array representing a test routine to be executed by the PCM transmission analyzer.

FIG. 9 represents the structure of a test array as it is produced after compilation. The test array includes a header comprising a test class field 91, a test number field 92 and a length field 93. This header is used by firmware of the IOP signal processing unit 41 to identify and/or verify a previously loaded test array and is not considered part of a core program. If the PCM transmission analyzer 4 is interpreted as a specialized processing unit of the telecommunication system which unit resides on the system bus of the common control 1, the control structure can be designed such that not all available test arrays be permanently stored in the subsystem memory but be down-loaded from the memory of the common control 1 to the PCM transmission analyzer 4 at the time of starting a test. In this case, the mentioned header may also be utilized by the common control 1 to identify the environment associated with a test, i.e. to establish temporary connection links from a device under test to the PCM transmission analyzer 4 in a mode, for example loop back mode, which is required by the test.

The test program, as such, represented by a test field 94 is comprised of the executable code for the interpreter program of the PCM transmission analyzer 4. It is terminated by an end of test opcode and has a defined length which is indicated in field 93 of the header. The contents of the last field, a checksum field 95 are calculated at an appropriate time during a down-load process as the modulo 16 sum of all bytes, excluding the first two fields 91 and 92 of the header.

Figure 10:
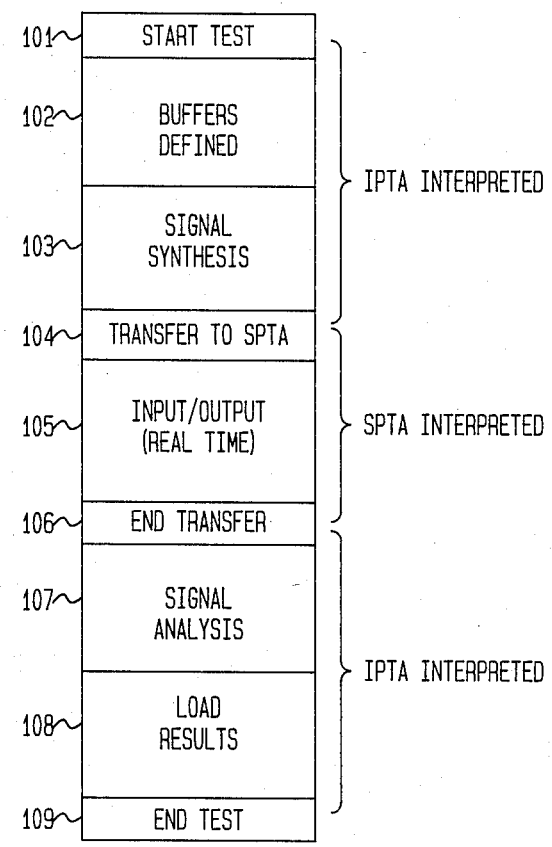
FIG. 10 is a diagram depicting the structure of a generalized test program in more detail with respect to the functional cooperation between the two subunits of the PCM transmission analyzer.

FIG. 10 shows the structure of a generalized test program. "Start Test", as indicated in field 101, must be the first statement of any program. It is followed by a group of register and buffer definitions in accordance with field 102. The IOP signal processing unit 41 will execute those opcodes which define buffers needed for the test, i.e. it allocates read/write memory based on required sizes and establishes tables to link the symbolic references to the assigned memory. The next phase is usually signal synthesis, see block 103, although for some tests only analysis is required.

For input/output operations, i.e. communication of the PCM transmission analyzer with the device under test, the IOP signal processing unit 41 will transfer control to the signal transfer unit 42, as indicated in block 104. The transfer point is set by the programmer by means of an opcode "Transfer". After completing this input/output routine, the signal transfer unit 42 returns control to the IOP signalling processing unit 41 when the former encounters an opcode "End Transfer" as indicated in block 106. The controlling subunit then completes the signal processing and analysis in accordance with field 107, test results are loaded into a status table, see field 108, and an opcode "End Test" in accordance with field 109 is the last executed opcode of the test array.

The high level signal processing language is designed for most convenience for the user. Only few restrictions and requirements are set in order to make this language available as a basic programming language. Each statement begins with an action verb such as "Define", followed by key words for any parameters. The verb indicates which parameters should follow although some may be optional. All parameters are preceded by keywords and there is no restriction with respect to the order of the parameters. The language allows to utilize "noise" words which are not interpreted by the compiler and are only intended to improve readability of the source program. Buffers, registers and labels can be freely determined with the limitation that only letters, numbers or underscoring are acceptable and such definitions may not exceed a predetermined length of 31 characters, for example.

Since the PCM transmission analyzer used fixed point arithmetic, magnitudes used in the test program are expected to be written in a fixed point two's complement format with an implied decimal point, the position of which is determined by the magnitude type. The programmable magnitudes are frequency, time, degrees, amplitude, and relative amplitude. The defined range for frequency is 0 to 3995 Hz in steps of 1 Hz. A magnitude value for frequency, therefore is a positive integer requiring a 12 bit format. Time values can be defined for a range from 0 to 65535 milliseconds in steps of 1 millisecond. Correspondingly, time values have a 16 bit format. The magnitude value "degree" covers a range from −359 to +359 in 1 degree steps, in two's complement a format of 9 bit and an extended sign is required.

Amplitude values are defined in a mean power level (dbm) in a range from −70.0 to +3.0 with 0.1 db steps. This can be translated into a format wherein the 8 lower most bits are reserved for a decimal representation of the fractional part of the magnitude, the next following 7 bits represent the integer and the most significant bit constitutes the sign bit.

Relative amplitudes can be set in a range from 0 to 4095 in steps of 1 as a number and as a power level from −99.9 to +99.9 in 0.1 db steps. The format, in this case, is the same as with mean power levels outlined above. The number representation of a relative amplitude is utilized in conjunction with A-Law companding for representing a linear value.

It may be noted that synthesis is made possible in multiples of 5 Hz only despite the given resolution of a frequency magnitude. Any frequency magnitude, therefore, is truncated to the closest multiple of 5, however, frequency measurements comply with the given resolution. Furthermore, the given time magnitudes and the possible resolution do not fully comply with the time units of the signal transfer unit 42. This unit operates based on time intervals of 250 microseconds, to this reason at compilation a magnitude given in milliseconds will be transformed into such time units by multiplying the number of milliseconds by four.

Some definitions may be added for clarification. A "register" is a temporary memory location with a unique name given by a programmer. At compilation a number is defined for each register and this identification number is passed to the interpreter every time a reference to the register is found. To this reason, the amount of registers to be specified within a test array is limited.

The term "buffer" specifies a time segment and is used for designating a corresponding memory area of individually determined length which stores input or output PCM data. Such buffers are utilized for storing synthesized signals, for example. The PCM transmission analyzer 4 transmits contents of buffers, receives signals from the telecommunication network and places such signals in buffers or analyzes signals contained in buffers. Buffers are identified by a name in the program which is translated at compilation into a 1 byte number.

The buffer concept is a significant characteristic of the PCM transmission analyzer 4, it may, therefore, be illustrated with respect to general principles of PCM data transmission utilized in telecommunication systems. Existing PCM telecommunication systems usually have a sampling rate of 8 KHz corresponding to the well-known sampling thereon. This sampling rate matches with its inverse, the sampling interval of 125 us (microseconds). Accordingly, from a line or channel 8 samples are collected per millisecond wherein each sample consists of 8 data bits.

It it is now intended to operate such a transmission test facility on buffers representing time segments the organization of such buffers has to be compatible with the sampling rate of the associated PCM telecommunication system. Therefore, in the above-specified buffers 8 bytes of memory are allocated to a time interval of 1 millisecond. The length of such buffers cannot be a fixed value, since depending on a specific test performed synthesized tones or tone patterns to be sent out or returned signal patterns received by the PCM transmission analyzer will vary in lengths. Therefore, the definition of a buffer includes its length in milliseconds, wherein each millisecond is an equivalent to 8 bytes of memory. A signal buffer has a maximum length which may be 255 milliseconds, for example, however larger memory areas can be defined by a string of buffers. The total number of buffers per test array is dependent upon the main memory space of the IOP signal processing unit 41, and in the given hardware structure described above it should not exceed 1280 milliseconds.

The term "table" is used for a set of data passed to the interpreter as part of a test array. Again, a table is defined by its number and its length. There is no other limitation to the length of the table but the length of the test array itself. The data on the table can be any set of constants in any form and at compilation those values are translated into their corresponding formats for use by the interpreter of the PCM transmission analyzer 4. Tables can be used for storing of data which may be loaded into registers or buffers or may be just required for comparison purposes. The only limitation is that data contained in a table can be used only once in a sequential manner during the execution of a test array.

The term "number" represents here integers which are represented either in decimal or hexadecimal format. Numbers may have one or two bytes in length, and at compilation all numbers are translated into hexadecimal format.

The term "offset" is used for 16 bit two's complement numbers which represent relative addresses and are passed by the compiler as part of a statement. When added by the interpreter to an absolute address they provide a target destination. Offsets are always calculated as the length in bytes from the beginning of the test arry to the destination.

The terms "entry point", "quadrant" and "step" also need some explanation. Whenever a reference to a frequency expressed in Hz or a phase in degrees as found in a test array, this number will be translated into a new magnitude at compilation. With respect to the magnitude values of frequencies, it was indicated that the PCM transmission analyzer synthesizes only frequency values in multiples of 5 Hz. Any frequency value given in a test array, therefore, is truncated to the closest multiple of 5 Hz. With this understanding the term "step" equals the frequency value as defined in a test array divided by 5 which specifies a range of step values from 0 to 799. The new magnitude is put into the same format as previously defined for frequencies.

Similarily, a phase magnitude expressed in degrees is translated into "entry point" and "quadrant". Quadrant represents a two bit number resulting from the phase modulo 90 degrees. As for example, a starting phase of 135 degrees is represented by quadrant "01" while a corresponding value of 340 degrees compares to quadrant "11". The entry point determines the location of the first value in a sine look-up table which is calculated from the remainder of the division modulo 90. The range for "entry" is defined from 0 to 400, that is the mentioned remaining fraction is multiplied by the ratio 40/9.

An example may illustrate these definitions for the last three terms: Assuming that a sine wave of 1005 Hz at 30 degrees and −10 dbm is to be generated in accordance with a test array statement. This statement translates into a quadrant value of 00, an entry point of $(30\times 40/9)=133$, a step value of $1005/5=201$ and an amplitude value −10.0.

Statements in High Level Signal Processing Language

As previously pointed out a test written in high level signal processing language is a set of sentences or constructs, each one describing an operation to be performed, normally one line long. Some of these sentences or statements translate into data base for direct execution by the PCM transmission analyzer 4, while others do not generate an opcode and are utilized only for implementation by the compiler. The former statements are executable statements, the latter statements are called non executable. In the following, some non executable statements will be described.

The statement "COMMENT" causes the line of text following the "comment" be ignored.

The statement "LABEL" is utilized to define a relative address by a name. At compilation, the offset from the beginning of the test array to "Label Name" is assigned, it can be then referenced by commands such as GOTO, IF, and CALL. "Label Name" does not need to be defined before it is referenced, however it must be unique within a program.

The statement "DEFINE REGISTERS" is utilized to assign consecutive numbers to each of the names in the definition at compilation time. These numbers are used as register identifications in further references within the same test array.

A statement "START TEST" is always the first statement of a program. Although it is not directly executable by the PCM transmission analyzer 4, it generates information for use with the administrative firmware of the IOP signal processing unit 41.

A statement "DO" is a another one of the statements which are not executable. This statement is used to combine groups of statements to form a single one. This is of particular advantage in conjunction with constructs, such as "IF". There is only one requirement that this group of statements has to be terminated by a statement "END" in order to define this group of statements linked by "DO".

The executable statements comprise a set of sentences that are interpreted by the PCM transmission analyzer 4. Each one of these statements generates at compilation a variable number of bytes of information or data base, composed of a first byte called opcode and one or more bytes containing optional parameters. The opcode describes the type of operation required while the parameters may be required for specifying the target of the opcode. First, there will be described statements which control the operation of the signal transfer unit 42 and represent input/output real time oriented opcodes with the exception of some statements which are common to both subunits of the PCM transmission analyzer, as will be indicated individually. All statements which are specific for the operation of the signal transfer unit 42 only must occur within a transfer/end transfer boundary as described above in conjunction with FIG. 10.

A statement "NOP" defines no operation and is utilized in conventional manner, however it has no effect on real time input/output performance and is a common statement for both subunits 41 and 42 of the PCM transmission analyzer.

A statement "INPUT TO BUFFERNAME" commands the signal transfer unit to input data from a subscriber line interface unit to the designated buffer until the buffer is full. Simultaneously, idle code is transmitted to the subscriber line module interface 31. The corresponding compiler output is a designated opcode and a second byte containing the buffer number.

A similar input command can be written for an input operation after a limited idle time. The execution of such an input command rejects any idle code received from the start of the execution until the beginning of an envelope. The time limit avoids endless execution and causes a failure condition if the time limit lapses without action. Obviously, the compiler output here contains the respective opcode, the buffer number and two further bytes which contain the specified time units for the set limit.

An output operation correspondingly is initiated by a statement "OUTPUT FROM BUFFERNAME" which causes data transfer just in opposite direction from the specified buffer to a subscriber line module interface unit 31. The execution automatically ends after the last word of the buffer was transmitted.

Buffer transfers are executed by means of an input/output operation controlled by a statement "INPUT TO BUFFERNAME 1 WHILE OUTPUT FROM BUFFERNAME 2$_\infty$". This transfer ends whenever the designated input buffer is full, however the input buffer may be truncated, if the output buffer is larger. Correspondingly, the compiler output contains three bytes with the opcode, an output buffer number and the designated input buffer number.

Two further statements are utilized for measuring the cadence on/off times of any type of signal. One command is related to the measurement of a signal active condition, i.e. a cadence which is a sequence of idle code-signal-idle code. A second command controls the measurement of off times that is the length of the idle period. Both statements are expressed by "CALCULATE REGISTERNAME=XX (LIMIT N)" wherein XX stands for "on" and "off" depending on the type of measurement. The respective routine of the signal transfer unit 42 is a real time process which requires no buffer to store the signal. The result of the measurement is stored in the designated register. The statement includes a time limit in order to avoid endless execution in case of a malfunction of the device under test. The test would fail if the time limit is reached. The corresponding compiler output contains one byte of opcode, one byte for the register number designated and two bytes for the given time limit N expressed in time units of the signal transfer unit 42.

As mentioned previously, the statement "END TRANSFER" is always utilized to specify the last sentence of a group of commands executed by the signal transfer unit. At execution time, correspondingly, the execution of the test array is passed back to the IOP signal processing unit 41. The compiler output is only one byte designating the respective opcode. Various other statements may be defined for routines of the signal transfer unit 42 as to control wait states or a synchronization of simultaneous execution of two commands on both subscriber line module interface unit 31.

The description will be continued with two statements which are common to both subunits of the PCM transmission analyzer. These statements are "LOOP (N)" and "END LOOP". These statements describe a routine wherein all commands between these two statements are repeated the number of times defined by number N in the loop statement. Nesting of loops is only allowed if executed by the IOP signal processing unit 41.

In the following an overview is given on the set of sentences, or commands, which are executed by the IOP signal processing unit 41. These are analysis, synthesis and signal processing oriented statements to which general type commands like LOOP or CALL have been added in order to improve the language performance.

One group of commands refers to calculations on registers. The target of the calculation is a buffer, one or more registers or a combination of register and data.

The destination is a single register. This set of statements is utilized in the analysis state of a test. One statement "CALCULATE REGISTERNAME=AVERAGE OF BUFFERNAME" allows the average of the modulus of a buffer to be calculated and placed in a register. The buffer is assumed to be filled with 16 bit two's complement numbers, all negative figures are two's complemented and summed to the positive figures in order to obtain the average. The compiler output is a three byte block containing the opcode, the number of the destination register and the number of the targeted buffer.

A similar statement "CALCULATE REGISTERNAME=RMS OF BUFFERNAME (LENGTH N)" performs a root mean square value calculation of the content of the buffer, assumed to represent a sinusoidal signal. The result of this calculation is an RMS value in dbm which is placed in the destination register. As indicated in the statement, the length of time over which the calculation is going to be performed is selectable. However, it may not go beyond the total length of specified buffer. Accordingly, the compiler output is a 5 byte block containing the opcode, the destination register number, the buffer number and the calculation length in a two byte format, wherein this time value is expressed in terms of a number of buffer words.

A corresponding statement "CALCULATE REGISTERNAME=FREQUENCY OF BUFFERNAME" executes the measurement of the frequency of a PCM periodic signal in compressed notation which is stored in a buffer. The three byte compiler output contains the opcode, the destination register number and the targeted buffer number.

Other commands which belong to this group of instructions defining a destination register for a calculated result concern basic arithmatic operations on registers such as division, multiplication, addition and substraction. Such commands are very common and, therefore, not described in more detail.

Another set of sentences relates to the generation of signals and their further use in input/output or analysis processes. Signals are synthesized in buffers of determined length previously defined and can be modified or manipulated in several ways.

One statement is "FILL BUFFERNAME WITH TABLENAME" which loads the content of a predefined table into the destination buffer. This instruction allows a programmer to fill a buffer with specific data such as pseudorandom noise, numeric series, etc. which data cannot be otherwise synthesized. The corresponding compiler output is a 3 byte block with the opcode, the buffer number and the table number.

Another statement of this group is "FILL BUFFERNAME WITH SINE N1 Hz, N2 DEG, N3 dbm". The three parameters N1 through N3 refer to frequency, phase and amplitude, respectively. Each of the three required inputs is provided either in an immediate form or as a variable contained in a register. These parameters are manipulated and given to the interpreter of the PCM transmission analyzer 4 as the starting point, step, amplitude and quadrant, opcodes which have been described previously. The compiler output, correspondingly, is an 8 byte block containing the opcode and the destination buffer number in one bute each, a step number, an entry point and quadrant number, and an amplitude number in two byte formats each. It is apparent that this described contents of the output of the compiler apply to the condition when all variables are given in immediate form. The compiler output will be adjusted accordingly if one or more of the variables are contained in a register. In this case, the register number would occur in the compiler output block replacing the immediate magnitude number.

It may be mentioned that additional statements may be created for this group of sentences, such as a statement "FILL BUFFERNAME WITH DIGITAL FROM TABLENAME" or "FILL BUFFER 1 WITH SUM OF BUFFER 2 AND BUFFER 3". The former sentence is utilized for filling a selected buffer with the sum of two tones. Frequency, phase and amplitude of each is stored in a previously defined table. The result is a compressed PCM representation of the sum of both tones. The latter statement executes the summation of the contents of two buffers on a word by word basis. The result is then stored in a third buffer of the same length, whereby the third buffer can be identical with one of the source buffers. These two statements are rather similar to corresponding conventional statements for microprocessor control which refer to register manipulation, with the difference that because of the specific characteristics of the PCM transmission analyzer 4 such operations are extended to operations on buffers.

Another one of these sentences executing the multiplication of buffers and expressed by "FILL BUFFER 1 WITH PRODUCT OF BUFFER 2 BY BUFFER 3" should be mentioned although this command seems to be trivial after the previous description of other commands. However, this command is another significant example of the power of this high level signal processing language. It was stated that buffers may be utilized for storing a sinusoidal signal, any multiplication of two buffer contents on a word by word basis each storing a different signal would result in modulated signal stored in the destination buffer.

This may become more readily understood by the way of a specific example. The task may be to obtain the amplitude modulated signal of a 1005 Hz, −10 dbm carrier signal and a 30 Hz, −30 dbm sinusoid. The respective modulated signal should be generated for 100 milliseconds. It should now be clear from the previous description that a corresponding sequence is the following.

Two buffers are defined as sources for carrier and sinusoid, a third buffer is defined as an intermediate buffer and filled with the carrier signal which is linearized in order to prepare for the modulation and is placed in its defined target buffer. The same process is repeated with the modulation signal again using the intermediate buffer for linearization. At this time, both target buffers contain the linearized signals to be modulated. The final stage is to fill the destination buffer which may be another buffer or one of the source buffers with the product of the contents of both target buffers. For a double sideband width transmitted carrier modulation, again one of the target buffers or another destination buffer can be filled with the sum of the original carrier signal and a result of the multiplication. As a last step, the previously defined intermediate buffer or any other buffer to be defined is filled with the product of the double sideband modulation converted into its compressed form. The contents of the intermediate buffer represent then the final result which is ready for transmission.

The described sequence included a linearization and a compressing step. Both procedures are executed by means of two separate instructions "FILL BUFFER 2

WITH LINEARIZED BUFFER 1" and "FILL BUFFER 2 WITH COMPRESSED BUFFER 1", respectively. In this first case, the source buffer contains a sinusoid signal in compressed notation and the destination buffer is a linear buffer. The opposite is true for the latter command. The software procedures described by these commands are byte by byte translations of the data in the respective source buffer in accordance with standard companding laws such as A-Law and MU-Law, respectively. The procedures are supported by corresponding translation tables which are standard modules of the control sections of digital telecommunication systems.

In order to obtain an envelope of a synthesized tone signal with smooth starts of rising and trailing edges of a pulse, ramp up and ramp down features are conventionally utilized. Two respective commands are provided for this purpose. With a command "RAMP UP BUFFERNAME" the beginning of a buffer, assumed to store a compressed signal, is multiplied by a constant slope signal of varying values in increasing sequence. The relative values lie within the range from 0 to 1. The opposite is true for the corresponding command "RAMP DOWN BUFFERNAME" effecting a negative slope of the envelope of the tone signal. Both compiler outputs are 2 byte blocks containing a respective opcode and the number of the buffer storing the tone signal to be processed.

The instruction set also includes a group of sentences which allow movements between registers or registers and data. Such commands are conventional load statement which have always a register as destination. Load statements as such are utilized in a variety of instruction sets of microprocessor systems and are not unique for this high level signal processing language. A more detailed description is, therefore, deemed not to be necessary.

Another subset of sentences is dedicated to declare buffers and tables used by the test array. Registers, as such, are not included in this catagory since their definition does not generate data base, as previously outlined. The definition set of sentences is insofar of interest as the syntax of this language allows for defining a reference label for buffers and tables. The label is translated into a table number and buffer number, respectively. Furthermore, buffers and tables as such may have varying length; therefore, the length of such a memory area has to be defined. Two corresponding statements for defining a buffer and a table, respectively are utilized for calculating the format of the data by the compiler according to the magnitude used. It has to be just recalled that the length of a table is defined in bytes, whereas the length of a buffer is given in milliseconds.

Another set of sentences is very similar to corresponding subsets of instructions created for conventional microcomputer systems, it is the set of constructs. The set of statements related to a condition allow the programmer to make decisions based upon results stored in registers or on the result when comparing buffers. It is, therefore, deemed not to be necessary to elaborate on all possibilities and just some basic definitions for the usage of such conditional statements are given. The structure of an IF statement is:

IF (condition)
    Then (statement)
    Else (statement)

It will be apparent to those skilled in the art that a variety of conditions can be included into this subset of sentences, such as identity of registers, buffers, and tables, comparisons for a condition "larger/smaller than . . . " and even values between boundaries can be defined as conditions for an IF statement.

For the application of conditional statements in this language, just some specific definitions apply. A "statement", as utilized in the above structure of an IF instruction, may be any single statement or set of valid statements defined for the present language, this may also include another conditional statement. This means that conditional statements may be nested. If the specified condition is true, all statements between "Then" and "Else" are executed and "Else" is skipped. If the condition is false, execution will start at "Else". The "Else" part of the sentence is optional, in other words if "Else" is missing, sentences between "IF" and "END IF" are executed only if the specified condition is true.

A further subset of instructions is related to filter statements which are utilized for performing a filtering function on a buffer. The result, the filtered signal, is placed in the same or in a different buffer. Four such statements are provided, each of these implementing one type of filter: low pass, high pass, bandpass and notch. All filter characteristics are second order with double zeros. The statements must be executed on linear buffers, or buffers assumed to contain linear information only. With respect to the format, it is understood that the compiler computes and passes to the interpreter of the IOP signal processing unit 41 up to four parameters per sentence, the gain constant of a filter cell and two or three filter coefficients, depending on the type of filter. These parameters are given all in a 16 bit format with two's complement numbers, wherein 15 lower most bits are decimal bits and the most significant bit represents the sign bit.

Ditital filters, as such, are very well known in the art and a theoretical introduction, therefore, is deemed not to be necessary. The four filter statements and the corresponding filter implementations are, therefore, illustrated by means of the respective transfer characteristics.

The low pass filter is based upon a transfer characteristic which is flat with a double zero at 4000 Hz. The respective equation is given below by formula (1):

$$H(z)=K(z^2+2z+1)/(z^2+2C1z+C2), \text{tm (1)}$$

wherein K represents the gain and C1, C2 are the filter coefficients. The actual statement also defines the cutoff frequency specified by a number N. The calculation of the respective parameters which are computed at compilation will be given below.

The transfer characteristic of the high pass filter again is flat with a double zero at 0 Hz as illustrated below by formula (2):

$$H(z)=K(z^2-2z+1)/(z^2+2C1z+C2) \qquad (2)$$

The filter coefficients C1 and C2 for the two filters described above are obtained, by calculating the function (3) wherein the cut-off frequency N[Hz] is the only input:

$$Csen=COS (2*\pi*N/8000) \qquad (3)$$

Then the coefficients of both low and high pass filters are given by equations (4) and (5), respectively:

$$C1 = -Csen*\{2 - SQR[4 - 2*(Csen2 + 1)]\}/(-Csen2 + 1) \qquad (4)$$

$$C2 = 3 - 2*SQR(2 - C1**2) \qquad (5)$$

With these filter coefficients the respective gains are represented by equation (6) for the low pass filter:

$$K = (1 + 2*C1 + C2)/4, \qquad (6)$$

and equation (7) for the high pass filter:

$$K = (1 - 2*C1 + C2)/4 \qquad (7)$$

The notation designates the square root operator by "SQR" and the exponential operator by "**".

The band pass filter is also a two pole, double zero filter, wherein the zero points are located at 0 Hz and 4000 Hz. The implemented transfer characteristic is given in equation (8):

$$H(z) = K(z^2 - 1)/(z^2 + 2C1z + C2) \qquad (8)$$

It may be noted that the coefficients for the band pass filter are not the same as the above calculated coefficients for low and high pass filters and an explanation is given below. Two parameters have to be included into the respective filter statement, a parameter N1 which represents the center frequency and parameter N2 illustrating the bandwidth of the filter.

There is also provided a statement for a notch filter which is a band stop filter with two zeros at the specified frequency. The result is the elimination of such frequency. The corresponding transfer characteristic is represented in equation (9):

$$H(z) = K(z^2 + 2C3z + 1)/(z^2 + 2C1z + C2) \qquad (9)$$

wherein C3 specifies the location of the two zeros, otherwise the calculation of those coefficients is shown below. The notch filter statement also has to include two parameters, N1 and N2 specifying the notch frequency and the bandwidth, respectively.

For the calculation of the respective gain K and the filter coefficients C1 through C3 of the band pass and notch filters, the input parameters are the center frequency N1 and the bandwidth N2. The second coefficient C2 is calculated in accordance with equation (10):

$$C2 = EXP(-2*\pi*N2/8000), \qquad (10)$$

wherein, EXP represents the exponential function of base e. The first filter coefficient C1 is determined by equation (11):

$$C1 = -(1 + C2)* COS(2*\pi*N1/8000)/2 \qquad (11)$$

The third coefficient C3 which is utilized for notch filters only is defined as an equation (12):

$$C3 = -COS(2*\pi*N1/8000). \qquad (12)$$

With these filter coefficients the respective gains K for bandpass filters and notch filters, respectively can be calculated. Equation (13) determines the gain K for bandpass filters:

$$K = (1 - C2)/2, \qquad (13)$$

and equation (14) specifies the gain K for notch filters:

$$K = (1 + 2*C1 + C2)/(2 + 2*C3). \qquad (14)$$

The set of instructions, furthermore, includes various miscellaneous statements, such as "TRANSFER" and its companion "END OF TRANSFER" which must be used by a programmer as commands for transferring the control from the IOP signal processing unit 41 to the signal transfer unit 42 and in the opposite direction, as already previously described. A statement "END TEST" must be utilized for defining the end of test array where upon a test in progress is stopped and the test target is put into its idle state. It may be noted that this statement does not have to be the last statement of a written program, however it is the last statement to be executed.

Similarly, another pair of statements "CALL ROUTINE NAME" and "RETURN" is provided for executing of routines, i.e. sets of opcodes repeated or frequently used by more than one test array. Such routines could be located at any memory address within a test array zone, which allows the creation of routine libraries to be used by one or more programs. It may be noted that nesting of such routines may be made possible, wherein respective returns are satisfied in a last-in-first-out mode.

Another one of these miscellaneous statements is a statement "GOTO LABEL" which is a more conventional instruction allowing to alter the normal flow of execution of a test and to jump to the address defined by the label. It may be noted that this jump does not require a later statement "RETURN".

A last group of statements is used for communication of the PCM transmission analyzer 4 with the common control 1 when reporting on the results of a test. Global test results, such as an indication for pass and fail of a test include just 1 byte of data, however, it may be realized that more than one response may be transmitted to the common control 1 during the execution of a test, therefore programming is not limited to the usage of a single register utilized for such a response. The contents of any specified register or memory location may be transmitted to the common control 1 when reporting on measurement results, for example.

A complete listing of one implementation of the high level signal processing language described above is contained in a listing of opcodes in Appendix A.

Firmware Structure of the PCM Transmission Analyzer

Based upon the high level signal processing language described above, test arrays are written off-line. As indicated, they are then compiled and linked to test modules that define the environment of the test to be executed and finally down-loaded into local memory of the IOP signal processing unit 41 from the memory of the common control 1 using system input/output commands. Such commands may also instruct the PCM transmission analyzer 4 to execute a specific test array already resident in its memory. At the same time, one of the two subscriber line modules connected to the signal transfer unit 42 is assigned to the test array, so that the test array is defined by the "device" where it is being run. If down-loading is successful, and the test environment ready, the test may be run. This is initiated by the common control 1 by means of a special start command SIO START, for example which is decoded by the IOP signal processing unit 41 as described in conjunction with FIG. 5.

Figure 11:
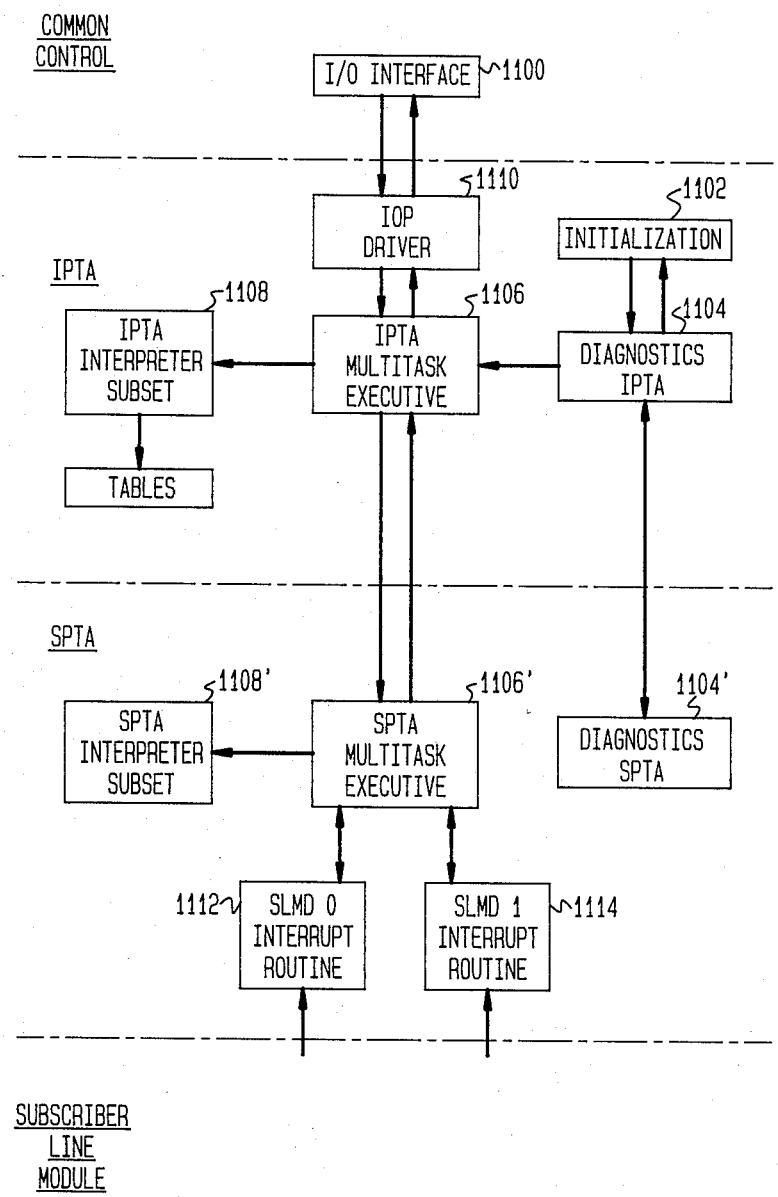
FIG. 11 is a block diagram representing the modular firmware structure of the PCM transmission analyzer.

The operation of the PCM transmission analyzer 4 and its both subsections is supported by firmware modules which are schematically illustrated in FIG. 11 and briefly described in the following.

The initialization module 1102 is called by a power up or a reset command from common control 1. The module creates interrupt vectors, clears memory and initializes programmable peripherals. It then transfers control to diagnostic modules 1104, 1104' verifying hardware functions and finally gives control to executive modules 1106, 1106'.

These executive modules each constitute a task scheduler for the respective subsection of the PCM transmission analyzer 4. Each module is capable of handling execution of two test arrays concurrently, each test being associated with a respective device, i.e. one of the subscriber line modules 31. The executive modules 1106, 1106' monitor execution of test arrays by assigning different states while the test progresses and allocate common resources, like an interpreter module 1108, to either device as those need them. Any executive module acts, in fact, as a multi-task executive for two test arrays that can be activated, suspended, reactivated or aborted according to external events and the state of the test. One executive module, the IPTA executive module 1106 resides in the IOP signal processing unit 41. The second executive module 1106' is associated with the signal transfer unit 42 and is a reduced version of the IPTA executive 1106 in the sense that it defines less states and has less resources to allocate. This module controls the respective interrupt routine for the designated device, as indicated by blocks 1112 and 1114.

An IOP driver module 1110 resides in the IOP signal processing unit 41 in its entirety and handles communications between the PCM transmission analyzer 4 and common control 1 in co-operation with its I/O interface module 1100. It receives commands to load or execute tests via hardware interrupts. It loads test arrays into local memory of the IOP signal processing unit 41 and passes to the IPTA executive 1106 all the information needed for execution. The module can be called by the executive module 1106 for reporting of results.

The firmware further provides two interpreter modules 1108 and 1108' each residing in a respective one of the IOP signal processing unit 41 and the signal transfer unit 42. The interpreter modules constitute a set of routines created to execute sentences of a test array. Each subroutine is invoked by the associated executive module 1106, 1106', respectively and interrupts one sentence of the described high level language in correspondence with one command of the test sequence. The commands are passed in the output format and arranged in entire sequences to form the test array. Subsets of synthesis and analysis routines reside in the IOP signal processing unit 41, while input/output and real-time oriented routines reside in the signal transfer unit 42.

The two corresponding diagnostics modules 1104 and 1104' are established for self-testing and are called at initialization or at random by common control 1 by means of a test command. Both modules execute test routines on the hardware of the respective sections of the PCM transmission analyzer 4 to verify the sanity of this subsystem.

As outlined above, the executive modules 1106 and 1106' direct the orderly execution of the test sequences. To this reason, they supervise the overall performance of the subsystem with the help of a state/event decision mechanism. This structure allows the executive module to know the state of the execution of each test at any given time, and to change it according to the availability of the shared resources and its own progress. The executive module being divided into two subsets that reside in the IOP signal processing unit 41 and the signal transfer unit 42 provides means for communicating of the subsets through an interrupt driven protocol.

The IPTA Executive Module

Referring first to the IPTA executive 1106 its function will be described in more detail in the following. It receives requests to initiate test array executions and invokes the IPTA interpreter module 1108 for decoding of the test array statements. It then provides memory allocation of buffers, registers and tables. During the execution of test arrays it supervises their evolution by assigning different states as the test progresses. It handles the communication protocol with the associated SPTA executive 1106', including the transfer of control of execution of a test sequence. It reports test results to the IOP driver module 1110 and detects hardware or firmware malfunctions during test run time and takes an appropriate decision. Finally, it is designed to manage simultaneous execution of two test arrays each temporarily associated with one of the subscriber line module interfaces 31, and resolves contention problems in case of conflict.

For each of the two subscriber line modules connected to the PCM transmission analyzer 4, the following states have been defined wherein numbers shown in parenthesis represent such state and are placed in a status table for each device separately.

IDLE (F): The line module has no task assigned and therefore is available.
PENDING START (0): A request from common control 1 to run a test has been received. The task of running the test has not been initiated yet.
ACTIVE (1): The test is in progress and running under control of IPTA executive module 1106.
TEST COMPLETED (2): Execution of the test sequence finished. Results are ready to be transferred to common control 1 under control of the IOP driver module 1110.
I/O SUSPENDED (3): Control of the execution of the test has been passed to the SPTA executive 1106'. The test enters a dormant state until control of the execution is transferred back to IPTA executive 1106.
WAIT (4): An I/O test sequence has been performed on the test. IPTA executive 1106 will restart execution of the test as soon as the conditions to leave the wait state are met.

Following rules govern transitions between states based upon the requirements of the IPTA executive module 1106.

State "0" is entered only if the device is available (in idle state), and upon reception of a Start IO command. The IOP Driver interrupt routine that services such request sets the device to busy and the state to "0".

The state of the service is raised to "1" (active) when the state of the second device allows so. Otherwise it will remain in start pending state until the second device releases the interpreter module 1108 used during the active state, or completes the assigned priority task.

From an active state, a test can be I/O suspended, completed or aborted. The test goes to an I/O suspended state during the decoding of a TRANSFER opcode. Execution of the test continues then at the SPTA execution module 1106'. While in this dormant state, resources become available for the second device.

The test array enters the completion state from an active state if the END TEST opcode is executed or if a malfunction (like a non-existent opcode) is found. In the latter case, the test is aborted.

A test leaves the I/O suspended state and is placed in the completion state (2) if the signal transfer unit 42 fails to communicate with the IOP processing unit 41 during the execution of TRANSFER, as well as when the former reports a hardware device failure. The malfunction is conveyed to common control 1. In all other cases the end of the I/O transfer, marked by an interrupt, generated by the signal transfer unit changes the state of the test to WAIT (4).

The test array returns to the active state from WAIT whenever the partner device's own state allows the transition. For instance, device 0 will go from state "4" to "1" if device 1 is idle, in pending start, I/O suspended or wait state. However, it will remain in state 4 if device 1 is active or in test completed state.

Figure 12:
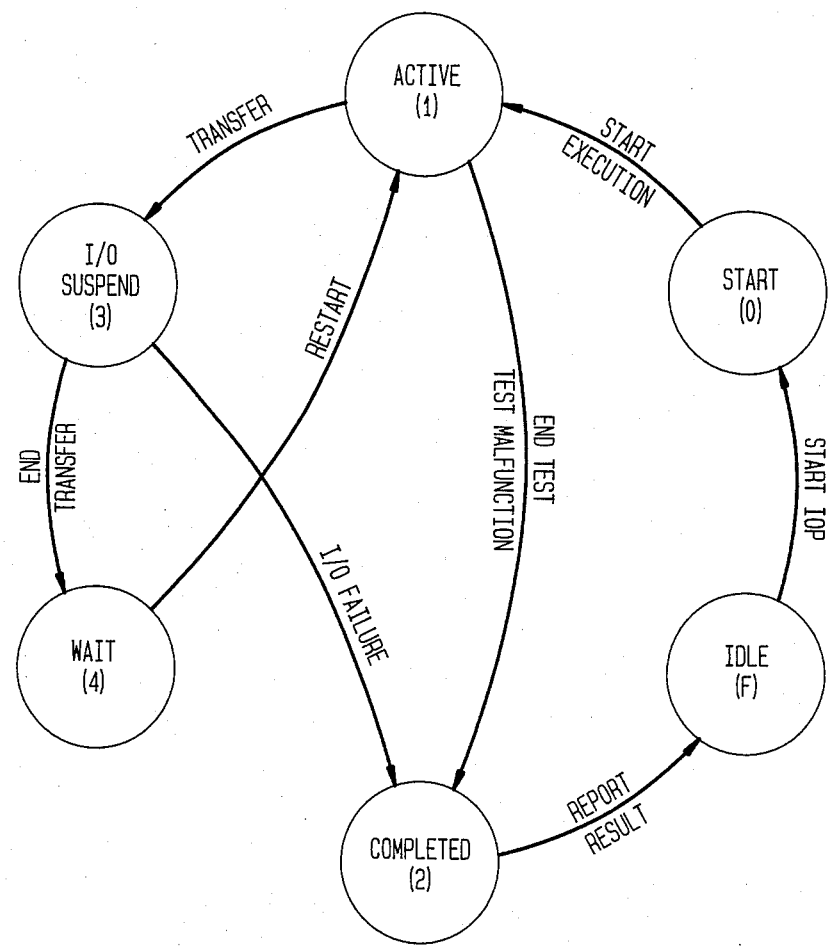
FIG. 12 is a state diagram illustrating possible transitions between different states of the IOP signal processing unit while occupied with executing a test array.

During the test completed state, test results are reported to common control 1 via a call to IOP driver module 1110. Prior to such transfer, IPTA executive module 1106 reads the status of the partner device. For the reasons explained the call to IOP driver module 1110 cannot take place while the partner device is in state I/O suspended, so the calling device will wait indefinitely. In one case however, the partner device will never leave state 3, and that is when it is waiting for synchronization. To solve this lock condition, IPTA executive module 1106 requests SPTA executive module 1106' to abort the partner device's test, forcing its state to change from 3. FIG. 12 showing a state diagram for one of the devices when the other is in state IDLE (F) illustrates the described transition mechanism.

Figure 13:
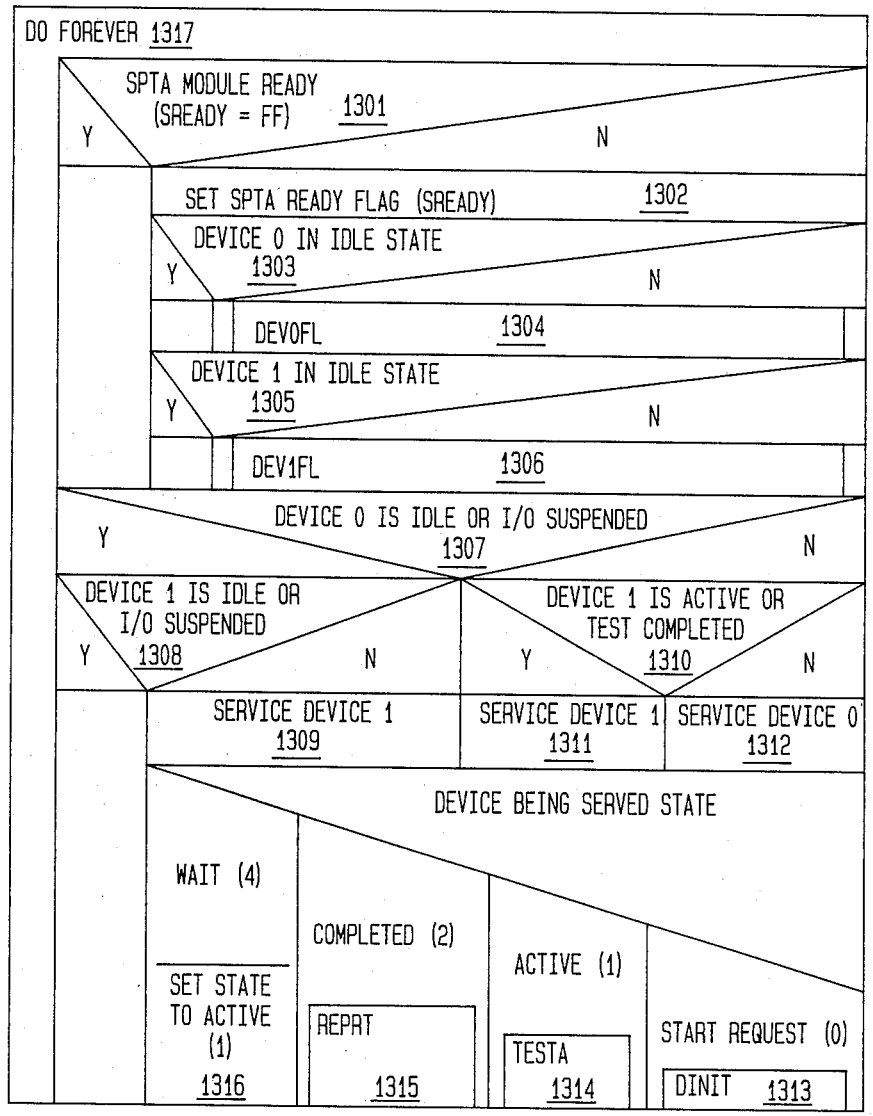
FIG. 13 is a flow chart representing the overall operation of the IOP signal processing unit performed under control of an executive firmware module including various subroutines.

A flow chart, shown in FIG. 13, illustrates the overall operation of the IOP signal processing unit performed under control of the IPTA executive module 1106. The flow chart is presented in a compressed form of notation which differs to some extent from conventional representation. Therefore, an introductory remark may be noted. The basic difference to conventional representation is that the lines usually indicating the flow of the program between subsequent steps are eliminated, and successive functional steps are presented by separate blocks arranged in a manner directly following each other. A test or branch condition is indicated by diagonal lines within the respective block and pass or failure of the test are indicated by "Y" representing "YES", and "N" representing "NO", respectively. The crossing point of the diagonal lines with the bottom line of the respective block now determines the position of a vertical dividing line between a left and a right column each of which containing the subsequent steps for the respective branch. A subsequent horizontal line running across both columns represents a junction of the two respective branches of a program flow. Loop conditions are indicated in a similar manner. A separate column runs from a bottom line where the loop condition originates up to the respective program block which represents the re-entry point of the program loop. "Nesting" is made possible by extending this scheme.

These definitions will be more easily understood by the way of an example which is given in conjunction with the following description of the operation performed under control of the IPTA executive module 1106 represented in the flow chart of FIG. 13. The program begins with a test presented in block 1301 which checks the current status of the signal transfer unit (SPTA module). The ready state of this unit is accompanied by a corresponding flag signal S READY. This flag is set, as indicated in block 1302, if the previous test fails. Thereafter, the status of the two subscriber line modules, here called "device 0" and "device 1", are checked. The first test is related to device 0 as represented in block 1303. If the test fails a subroutine represented by vertical double lines is initiated. This routine is a failure routine abbreviated DEV0FL and is represented by block 1304. Otherwise, if the test is passed, this routine is omitted and the program proceeds immediately to a corresponding respective test for device 1 which is shown in block 1305. The corresponding failure routine is abbreviated DEV1FL.

The two tests and possibly the corresponding failure routines concerning the two devices can be omitted if the test for the ready flag signal S READY represented in block 1301 is successful. In other words, at this time the two branches of the program flow resulting from the first test shown in block 1301 run together in a junction represented by the upper boundary of block 1307.

Block 1307 represents a further test for the status of device 0. If this test is passed the program proceeds with a first main branch. A corresponding test is subsequently performed for the second device 1. If this test represented in block 1308 is also successful, no further activity is required for completing this program run and by means of the loop condition represented by block 1317 a subsequent run is started by performing the test shown in block 1301. If, however, the test represented by block 1308 fails a busy condition of device 1 is indicated and device 1 is serviced as represented by block 1309.

Returning now to the test illustrated in block 1307, if this test fails, the program will branch out to a second main branch and the test shown in block 1310 will be executed. If this test for a corresponding state of device 1 is successful, again this device will be serviced as represented by block 1311, otherwise device 0 will be serviced as represented by block 1312.

The described program flow implements the state transition mechanism explained above. The kind of service depends on the current state of the respective device and is represented in general by blocks 1313 through 1316 which represent four different possibilities and corresponding subroutines to be described in more detail. After the completion of a respective one of these subroutines the program run is completed and, as indicated before, the loop condition of block 1317 leads back to the operation represented by block 1301.

Block 1313 represents in general a state 0 service routine which prepares a test array instruction pointer from a table number. This table number specifies a memory table of the local memory zone where the respective test array has been stored during down-loading. When this table address is set in a test array pointer, the test state, as described previously, is advanced to state active (1).

Figure 14:
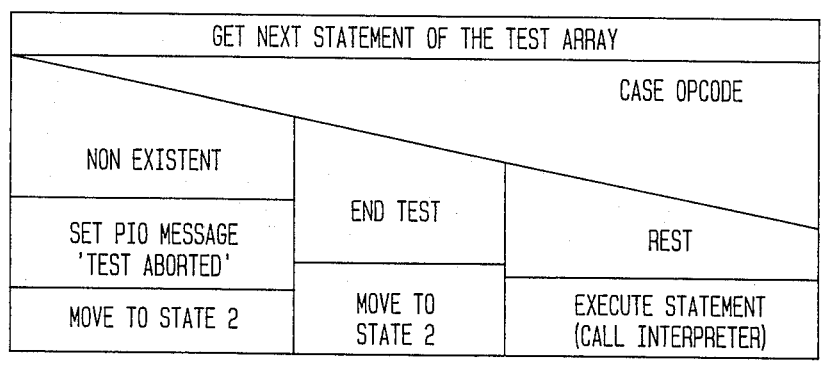
FIGS. 14 and 15 are flow charts illustrating respective service subroutines referred to in FIG. 13.

The state (1) service routine represented by block 1314 and abbreviated TESTA analyzes the next opcode of the test array and calls the interpreter module 1108 for execution of the statement. This subroutine is illustrated in a flow chart shown in FIG. 14 which illustrates the three different possibilities involved. In case of an invalid opcode the test is aborted, as shown in the left hand column. If a test is completed, as represented by the center column, control is returned to the IPTA executive module 1106 which will invoke the routine again until the state of test array changes. As complained above, the test array enters state 3 during execution of a command "TRANSFER" and state 2 upon occurrence of a command "END TEST". Otherwise, as indicated in the right hand column the activated statement will be executed during normal program flow without change of state.

Figure 15:
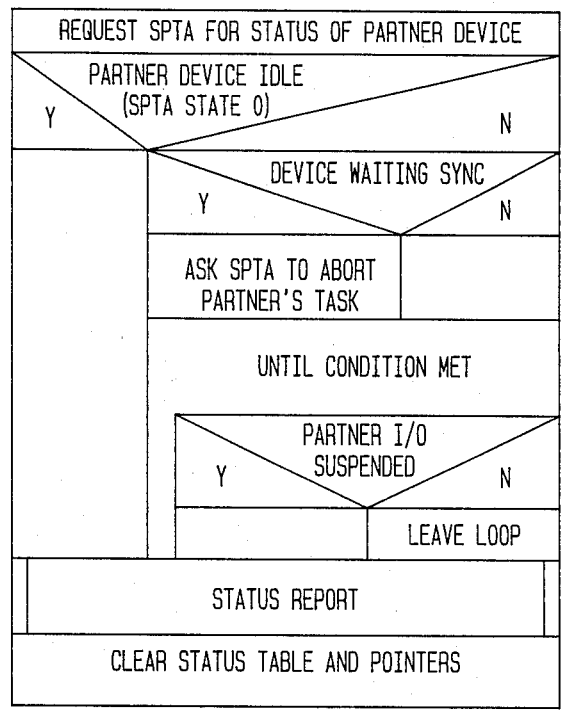

The state 2 service routine is schematically indicated by block 1315 in FIG. 13 and represented in more detail in the flow chart shown in FIG. 15. A main task of this routine is to report results to common control 1 by means of a call to the IOP driver module 1110. The routine also checks the state of the partner device, as explained previously in conjunction with the state transition mechanism. These tests of the partner device are performed prior to the actual status report which is a subroutine "STATUS REPORT" called from the IPTA executive module 1106 when test results need to be passed to the status report area in the common control 1 and the respective common control command is going to be terminated. The status report routine, as such, is part of the IOP driver module 1110. After the execution of this subroutine status table and various pointers associated with the respective test array are cleared and the test array is completed.

The only purpose of the service indicated in block 1316 of FIG. 13 is to change the state of the test to its active state, as described previously with respect to the state transition mechanism.

The SPTA Executive Module

The SPTA executive module 1106' being the companion of the IPTA executive module 1106, performs the following functions. It receives interrupt requests from IOP signal processing module 41 to execute I/O test sequences. It invokes its interpreter module 1108' for decoding of the test statements and supervises the evolution of test arrays, assigning different states as the test progresses. Furthermore, it handles the communication protocol with IPTA executive module 1106, detects hardware or firmware malfunctions during run time and reports the same. Finally, it manages simultaneous execution of two test arrays in normal or synchronization modes, when required, and monitors the status of the devices, i.e. subscriber line modules 31.

For each of the devices three states and one pseudo-state are defined:

IDLE: the device is not executing any I/O sequence except outputting idle code to the line. That is the situation after a test array instruction END TRANSFER and until a new IPTA request arrives.

IDLE waiting SYNC: this pseudo-state is entered upon decoding of a synchronization command. The device will remain in it until the partner device reaches the same condition or unitl the task is aborted. In the meanwhile, the device outputs idle code to the line and no new command is executed. The test remains stationary.

ACTIVE: the device is currently executing a real time task, i.e. an input. Real time tasks are always performed at interrupt level (see routines shown in blocks 1112 and 1114, respectively of FIG. 11), while continuous verification of the actual state takes place at executive level.

TASK COMPLETED: an individual real time task has been completed. The device is requesting the next task or instruction.

The following requirements apply for a state transition mechanism which is similar to the one described for the IPTA executive module 1106.

A device is kept in idle mode until a request from IPTA executive module arrives. The request appears in the form of an interrupt. If the IPTA request is the result of the execution of a TRANSFER instruction, the device is placed in state 2. In that state, SPTA executive module 1106' decodes one statement describing an I/O operation. The type of operation is indicated by the statement's opcode followed by optional parameters. State 2 can also be entered at the completion of a real time task. In this case, the device's interrupt routine detects the end of the task and places the device in state 2.

From state 2 and after invoking the instruction's corresponding interpreter routine, the device passes to execute the new task. Real time task execution takes place at interrupt level. The mechanism to swap to the new task consists in storing the address of the new real time routine in a register. The interrupt will jump indirectly to execute the task at that address. The interpreter generates the task routine address in a queue register from where it is loaded in a task type register when SPTA executive module 1106' decides to activate the new task.

Figure 16:
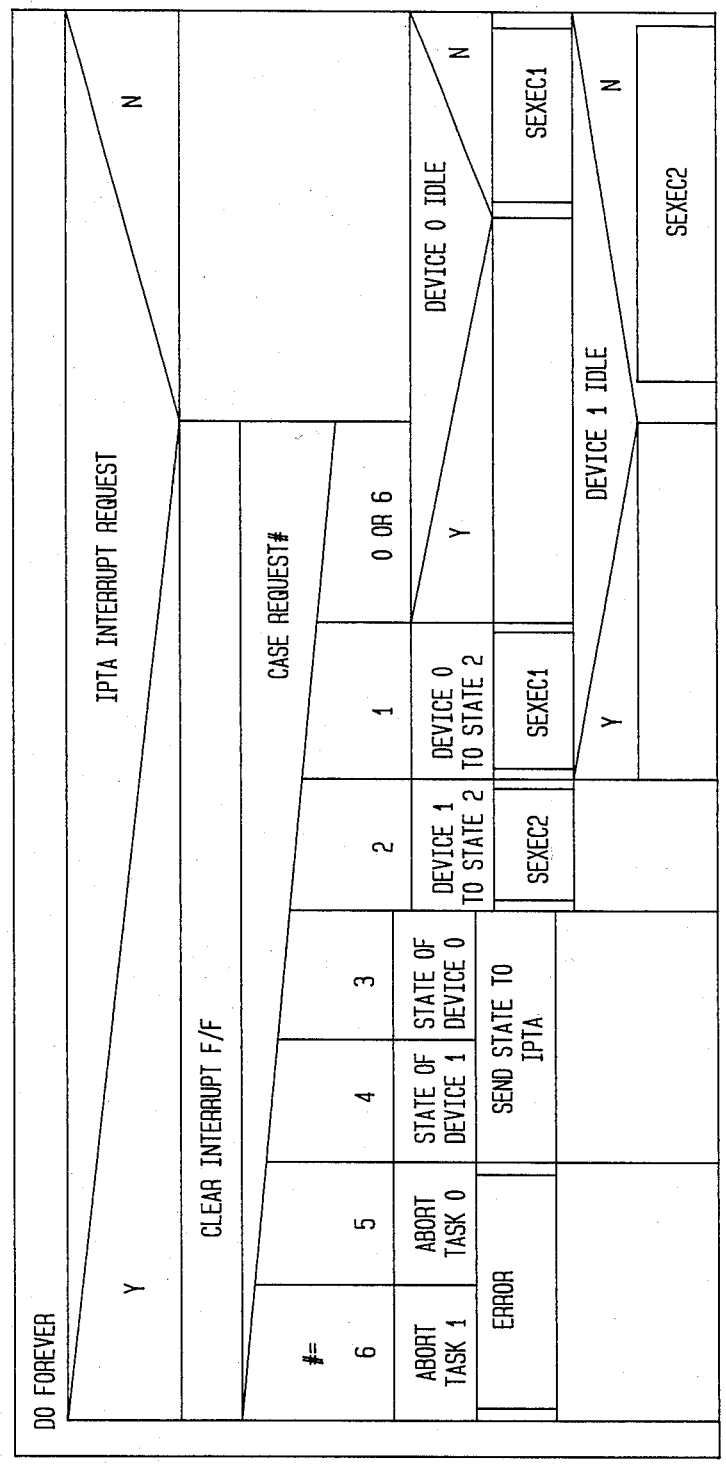
FIG. 16 is a flow chart representing the overall operation of the signal transfer unit under control of its executive firmware module.

The outlined functions of the SPTA executive module 1106' are implemented in form of a main loop which is illustrated in a flow chart shown in FIG. 16. Whereby interrupts from the IPTA executive module 1106 and device states are continuously polled when a new task (instruction) has to be prepared and the SPTA executive module 1106' invokes the corresponding interpreter routine. After that, it is determined whether the task must be executed immediately or put on hold until synchronization with the other device is achieved.

This main loop starts out with a corresponding interrupt test. If this test is passed a status flip-flop indicating a pending interrupt is cleared and the program flow proceeds to one of several branches which are designated by corresponding case request numbers. On the other hand, if the interrupt test fails, subsequently tests for the idle states of both devices are performed and corresponding subroutines abbreviated "SEXEC1" and "SEXEC2" are executed.

These two subroutines describe respective tasks for the associated devices and include a test for the operating condition of the corresponding device followed by an error routine if the test fails, otherwise a further test is performed which checks if the task is completed. When incomplete, eventually the task is performed as specified by the opcode of the corresponding statement.

The mentioned error routine causes the respective device be set to the idle state, a failure message be prepared and buffered, a corresponding interrupt be generated and sent to the IPTA executive module 1106. Thereafter, control is returned to the top of the kernel of the SPTA executive routine as shown in FIG. 16.

The SPTA executive module 1106' includes interrupt service routines that perform the real time transfers between the memory of the signal transfer unit 42 and the respective device. Those interrupts, one per device, are triggered by the hardware of the subscriber line module interface and consist of two parts: The first is the interchange of one word of data between memory and device; the second is the preparation of the next word and is specific of each instruction.

The IOP Driver Module

Referring now again to FIG. 11 and the IOP driver module 1110. This firmware module is in charge of handling all communications between the PCM transmission analyzer 4 and common control 1 and interfaces with common control software via physical and logical input/output commands. This module recognizes three software commands generated by common control 1: Reset IOP, Initialize IOP and Start IOP. Each command is decoded by hardware and triggers a vectorized interrupt to the appropriate firmware routine, except for Reset IOP which performs a normal hardware reset of the PCM transmission analyzer 4.

As far as the firmware structure, shown in FIG. 11, is concerned, the IOP driver module 1110 is the interface between common control 1 and the IPTA executive module 1106. As such, it receives commands and data from common control 1, handles the information as pertinent, and passes it to the IPTA executive module 1106 for further processing if so required. In some instances, as a result of an action initiated by common control 1, a response from the IPTA executive module 1106 is expected. This is the case of waiting for test results to be passed to the common control 1. To this reason, IPTA executive module 1106 can call the IOP driver module 1110 and report the results of the test, as previously described. The latter then completes the command by moving the results to a memory area of common control 1 and by returning control to the IPTA executive module 1106.

The interrupt handling routine "Initialization" and "Start Input/Output" plus a power-up sequence started by the common control command "Reset" are conventional with respect to any subsystem of a digital telecommunication system and insofar not of major significance for the PCM transmission analyzer 4. Various references have been made in the description above to the interface routines between common control 1 and the PCM transmission analyzer 4 and also between the IOP driver module 1110 and the IPTA executive module 1106, further detailed description is therefore deemed to be reiterative.

The Interpreter Module

The interpreter module of the PCM transmission analyzer 4 is divided in two basic subsets, the IPTA interpreter 1108 and the SPTA interpreter 1108'. These two subsets commonly provide a set of fully independent routines each one of them performing a specific function called an instruction, or statement. A set of these routines executed sequentially is what constitutes a test array. There is a unique correlation between a sentence defined in the previously described high level signal processing language and a corresponding interpreter routine. Each routine is associated with a respective one of the language statements for "interpreting" i.e. executing the command. To this reason the interpreter uses the output data generated by compilation and translates this information into data base.

The interpreter module is organized as a set of self-contained routines called exclusively by the corresponding executive module 1106 and 1106', respectively. The routines return control always to the corresponding executive module and have no relation with each other.

The IPTA interpreter 1108 handles those statements related to signals synthesis, input data analysis, memory management and program flow. The SPTA interpreter 1108' handles input/output oriented statements, in other words the set of opcodes that need to be executed by the signal transfer unit 42. The SPTA interpreter module 1108' is made of a collection of routines designed to prepare the environment for the execution of instructions for the signal transfer unit 42. The routines are called by the SPTA executive 1106' prior to executing the statement that they describe while the associated device, i.e. one of the connected subscriber line modules 31 is in state 2. Those statements that require execution at interrupt level will return control to the SPTA executive module 1106' for immediate action. All other opcodes that do not need exchange of information with the designated device will return control to the SPTA executive module 1106' with the "task completed" state. This module will then search for the next instruction and will call the corresponding interpreter routine.

Each subset of the interpreter module resides in the respective processing unit of the PCM transmission analyzer 4. Based upon the detailed description of the purpose and the characteristic statements of the high level signal processing language, it is believed that a complete description of all interpreter routines in full detail would be at least in part reiterative and therefore superfluous. Instead, in the following description of the IPTA interpreter module 1108 and the SPTA interpreter module 1108' will give only an introductory example and emphasize the more unique routines which are characteristic for the described high level language.

Figure 17:
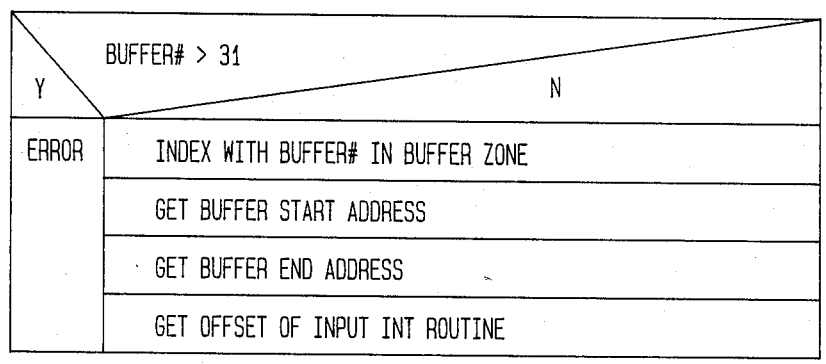
FIGS. 17 through 22 represent flow charts of several interpreter routines executed under control of the firmware of the signal transfer unit.

As an example for a conventional routine, the flow chart for an input routine INPUT is represented in FIG. 17. Start and end address of a specified input buffer number is retrieved from the buffer address area which is located in the memory area common to both the IOP signal processing unit 41 and the signal transfer unit 42. Both addresses are placed in fixed locations of the memory of the signal transfer unit 42 for use by the input interrupt service routine. The offset of this routine is saved in a temporary register until the transmitting device is placed in state (1). The routine will fill the input buffer with data received from the respective interface unit of the device at a rate of 2 bytes per interrupt. Even sizes of input and output buffers are required therefore since buffers have been defined in millisecond units with 8 bytes per millisecond.

Figure 18:
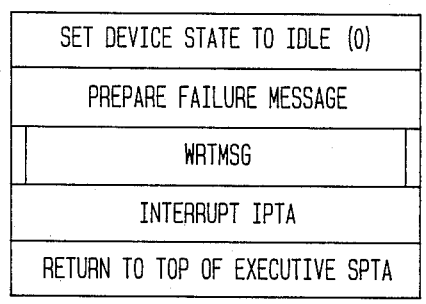

The described routine takes place when the opening test of the buffer number is correct, it may be recalled that the number of buffers within a test array is limited, the limit in this implementation is 31 buffers. The test fails if a higher buffer number is detected and an error routine is initiated which is represented in the flow chart of FIG. 18. This routine sets the device to idle state in accordance with the described state transition mechanism and prepares a corresponding failure message.

Figure 19:
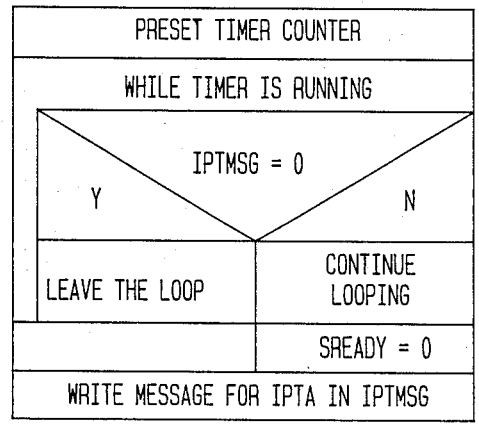

The message is sent out under control of a corresponding subroutine "Write Message" which is represented in the flow chart of FIG. 19. This routine is based upon the protocol concept between the signal transfer unit 42 and the IOP signal processing unit 41. The SPTA executive module 1106' sets a timeout counter and waits for a message control bit IPTMSG generated by the IPTA executive module 1106 to clear within this given time limit. Should the time limit expire prior to clearing of this message bit the described status flag S READY of the executive transfer unit 42 is reset. Otherwise the loop for checking the status of this message flag is left after clearing and the prepared message comprising "Failure of Device" is transmitted to the IOP signal processing unit 41.

Now returning to FIG. 18, after performing this subroutine an interrupt for the IOP signal processing unit 41 is generated by the SPTA executive module 1106'. The IPTA executive module 1106 serves the interrupt and analyzes the response. At this time the respective device is placed in state 2. The IPTA executive module 1106 clears the interrupt and the corresponding message control bit IPTMSG.

Figure 20:
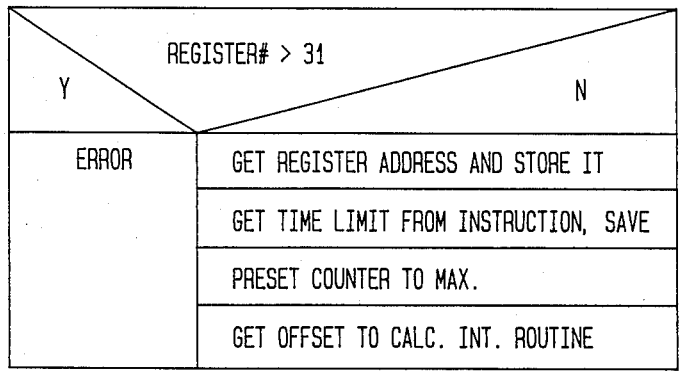

A second example for a SPTA interpreter routine is the routine "Calculate 'ON' Time" which prepares a measurement of the time between the beginning and the end of a signal envelope and is presented in the flow chart of FIG. 20. The measurement is executed in real time by counting the number of interrupts when the received data is not idle. The result is saved in a labeled register in milliseconds. As to be seen from the flow chart the opening step is again a test for a valid register number. If this test is not passed, the error routine described above is entered. Otherwise, the register address is stored, the time counter of the signal transfer unit 42 is set to its maximum value, and the offset is obtained for an interrupt routine calculating "on" time.

Figure 21:
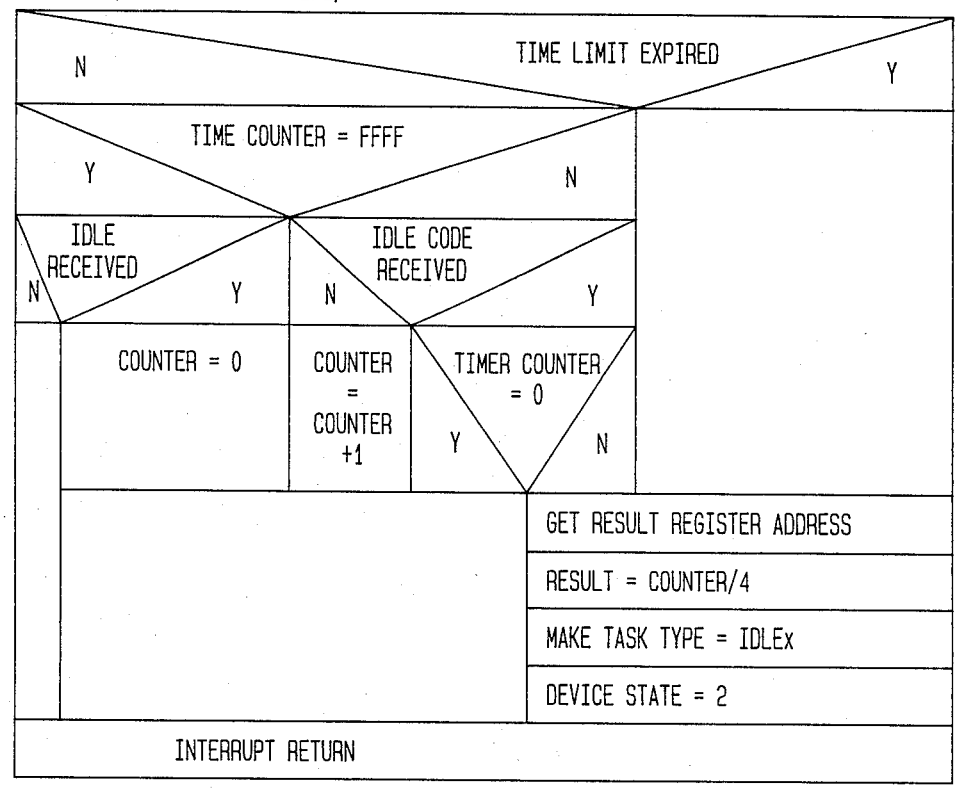

This interrupt routine is represented in the flow chart of FIG. 21. This flow chart requires an explanation of the algorithm employed. The theory behind is that the SPTA interpreter 1108' will set a counter to its maximum value as indicated before. For the counter to start moving, the received data must go to the opposite state of the one measured. This means idle code must be received when measuring "on" time. At that point the counter is set to zero and will remain zero until the count starts. If the overall time set by the opcode expires before the count starts, the result in the counter would be correct.

As an example, let it be assumed that the signal transfer unit 42 is trying to measure "on" time in a channel that contains only idle code, i.e. no signal. The time-out limit expires and since the counter was set to zero on the first idle code detection, the final result for "on" time is zero. However, if the channel has a continuous tone on it, i.e. never transmits idle code, the counter would not move from its maximum, so the final result for "on" time is maximum time. The result is given in milliseconds. Since subscriber line module interrupts arrive every 250 microseconds, the resulting count is divided by four, the device is put to state (2) and the subroutine terminates with an interrupt return.

Figure 22:
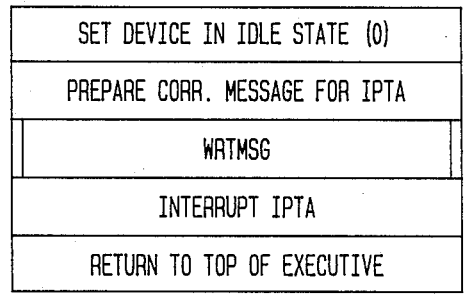

It was previously pointed out that control of the execution of a test array from the SPTA executive module 1106' is always returned to the IPTA executive module 1106 by means of a statement "End Transfer". Therefore, this single byte statement is always the last one interpreted by the SPTA executive module 1106'. A corresponding routine is shown in the flow chart of FIG. 22. The routine sets the corresponding device in idle state (10) and prepares an end message for the IPTA executive module 1106. Thereupon, the subroutine "Write Message" described above in conjunction with FIG. 19 is executed, an interrupt to the IPTA executive module 1106 is generated, and the program of the signal transfer unit 42 is continued at the top of the kernel for the SPTA executive module 1106' shown in FIG. 16.

From the above description of the statements of the high level signal processing language with reference to the operation of the IOP signal processing unit 41 it should be apparent that a variety of statements refer to more conventional routines, such as data moves, memory management, conditional statements, flow statements and respond statements. Corresponding interpreter routines while forming a major part of the IPTA interpreter module 1108 are less significant. The unique design concept is mostly characterized by the statements referring to signal synthesis, signal analysis and including the filter routines. The following description of the IPTA interpreter module 1108 will therefore emphasize on the latter group of interpreter routines.

One of these interpreter routines belonging to the group of calculations on registers is the routine "RMS of a Buffer" which implements an algorithm that calculates the root mean square voltage value of a signal stored in a designated buffer. The routine is divided into two parts: during the first part a linear number is prepared which is equivalent to an RMS voltage presentation of the stored signal; during the second part this linear value is transformed into its logarithmic representation in dbm.

Figure 23:
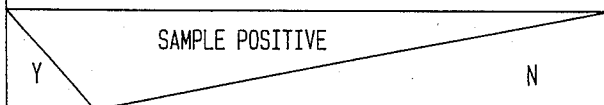
FIGS. 23 and 24 show flow charts representing an interpreter routine for calculating an RMS value of a stored signal and transforming the same into a compressed format, respectively.

The first part of this interpreter routine is illustrated in the flow chart of FIG. 23. The implementation of a RMS calculation is based upon the assumption that the object of the measurement is a pure, single sinusoidal tone. Then, since the ratio average to RMS value of a tone is a known factor, the task is to calculate the average of the rectified tone and to multiply the result by the RMS factor.

As described previously with respect to the corresponding RMS statement, the length of the calculation, i.e. the number of samples is given with the opcode. The signal stored in the buffer may not fill the buffer entirely, and in accordance with general requirements, the remainder may contain idle code. This idle code is removed from the buffer. At this time the data to be calculated is available and the accumulator of the IPTA processor 410 is set to zero. The program flow then continues with a loop which is run for the specified length of the calculation. Sample by sample is read from the buffer, whereby the calculation starts at the end of the buffer and moves towards the beginning. Each retrieved sample is tested for a positive magnitude and complemented if the test fails. This step corresponds to a rectification of the signal. The resulting positive sample value is then accumulated to the previous contents of the accumulator.

When all samples have been read from the buffer a coarse average value is obtained which is defined as the integer of the ratio of accumulator contents and length; the remaining part equals the accumulator contents modulo length, i.e. number of samples. Thereupon, the average and the remainder are multiplied by the RMS value factor resulting in a coarse RMS value and a fine RMS value. Both coarse and fine RMS values are added to form the final RMS value. At this time the result is described in a linear format which has to be compressed into one of the 128 discrete decision levels corresponding to a defined A-law chord and step.

Figure 24:
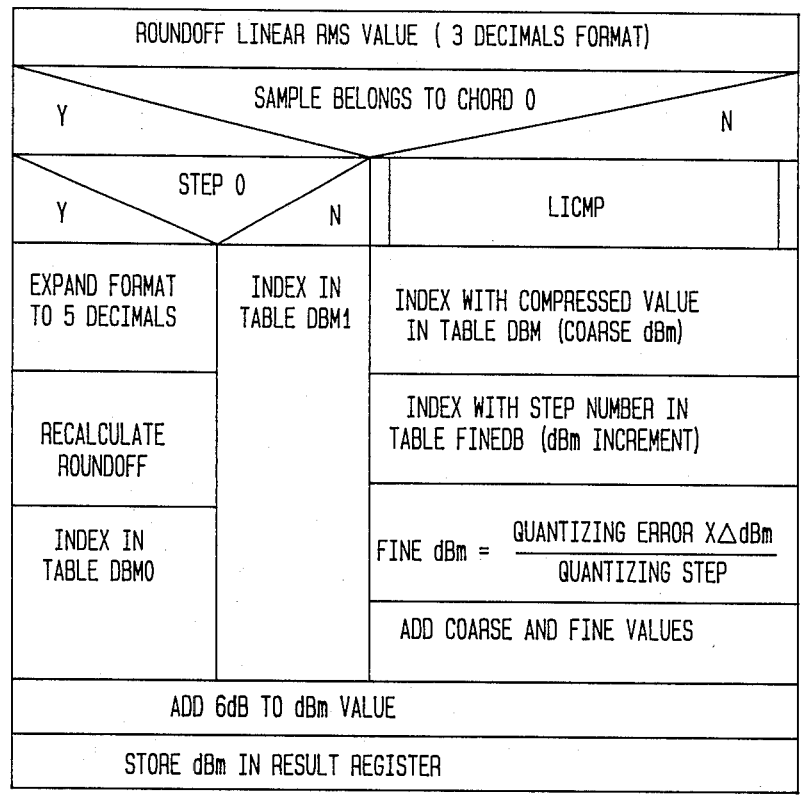

This transformation into a dbm value is illustrated in the flow chart of FIG. 24. For the following description it is assumed that the theory behind the transformation of a linear PCM signal into a compressed PCM signal in accordance with A-law or MU-Law is well known and does not need further explanation. The corresponding transformation procedure is basically a translation into the logarithmic signal representation. In accordance with the implemented one of the companding laws, chord and step have to be retrieved for proper translation. The first quantization step leaves a residual as quantization error which is saved. A coarse dbm value is obtained by indexing in a first table referred to as table DBM. A fine dbm value, or interpolation, is added to the first, the fine value is the ratio of the quantizing error to quantizing step multiplied by the dbm factor obtained from a second table referred to as FINE DB, wherein the dbm factor equals the dbm increment for a particular step. Fine and coarse values are added and 6 db are added to the obtained dbm value since the table DBM is referenced exactly 6 db below overload level of +3 dbm zero. The final result is stored in a result register. The method varies for chord zero linear samples in order to increase the accuracy of the result, the reason for this measure will be apparent from the theory of the companding laws.

Figure 25:
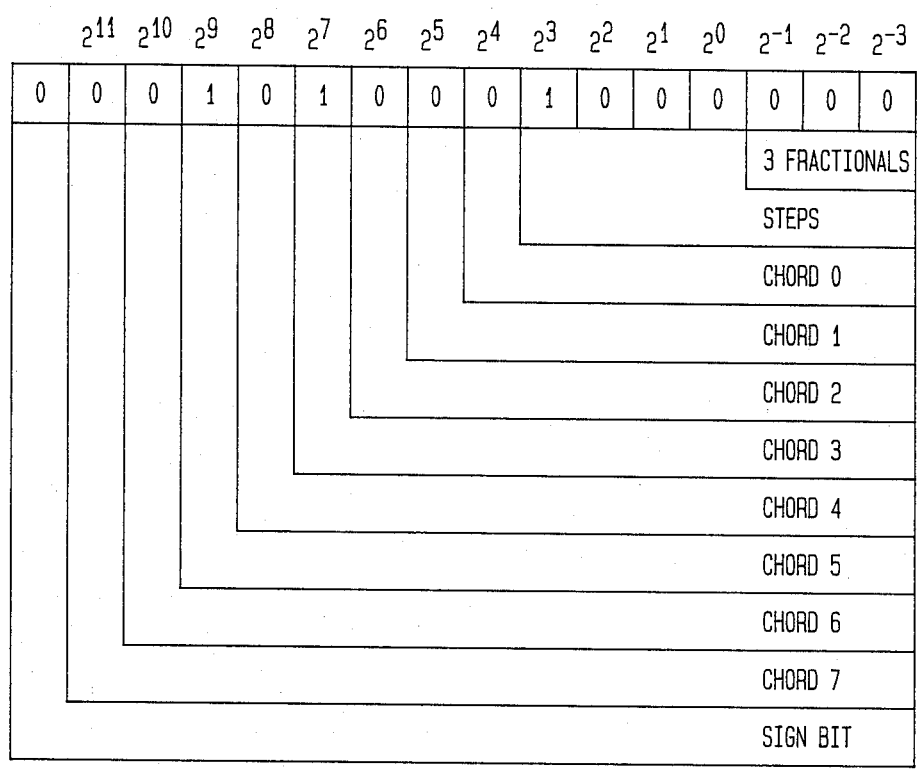
FIG. 25 shows a diagram of the linear format of a sample signal to be transformed into a compressed format and illustrates the subroutine performed in accordance with the flow chart shown in FIG. 24.

An example of the transformation procedure is described in the following in conjunction with FIG. 25 which shows a format of a linear RMS value to be compressed. It is assumed that this value, the linear result of an RMS calculation, is 648. In A-law and for specified format, the number would be represented as shown in FIG. 25. If this value is processed in accordance with the described compress routine it is determined that the number belongs to chord 5, step 4, i.e. lies within the range of value 640 to 672. The residual or quantizing error from the beginning of the step is 8=648−640. Indexing in the table DBM with chord 5, step 4 gives the lower limit in dbm for that chord and step which is −15.99 dbm 0. This is the coarse value. Now for chords 1 to 7, the dbm increment of a particular step is a constant which is independent of the chord. From tale FINE DB it is retrieved that such increment is 0.43 dbm for step 4. Linearity is assumed between steps, therefore, the residual is divided by the step size of chord 5 which corresponds to 32. The result is 0.25 which is multiplied by 0.43 dbm. The resulting fine value is 0.11 dbm which is always a positive value. As indicated above, the table DBM is referenced exactly 6 db below overload level and therefore, the final value=−15.99+0.11+6=−9.88 dbm 0. As can be easily cross-checked, the same result is obtained from a calculation 20 log (648/4032)+6 [dbm].

Figure 26:
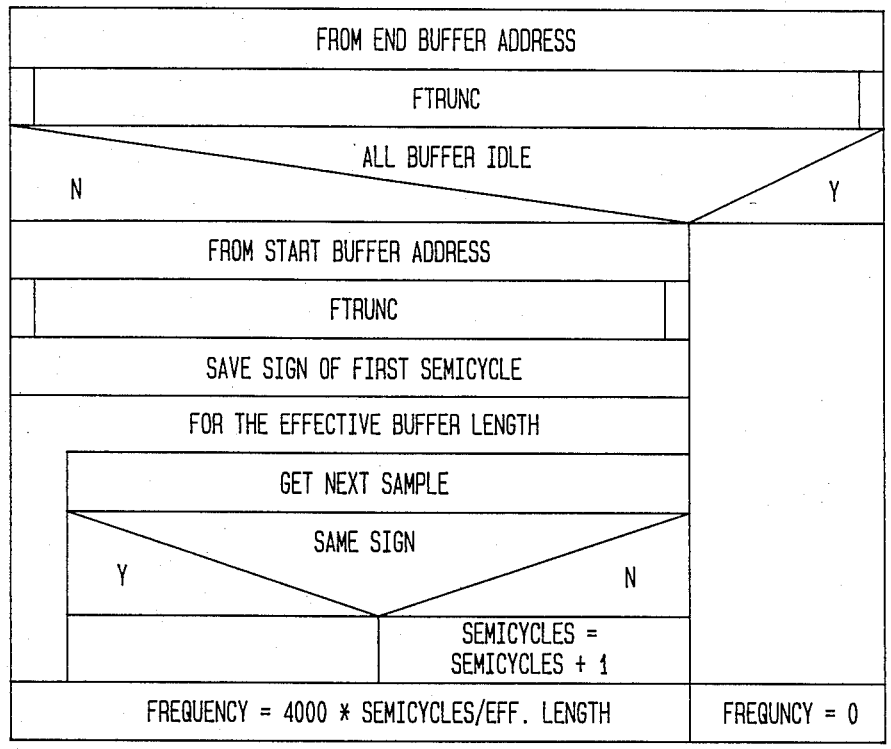
FIGS. 26 and 27 show flow charts commonly representing an interpreter routine for calculating the frequency of a stored signal and counting "on" and "off" times of this signal.

Another routine of the IPTA interpreter 1108 is calculating the frequency of a buffer. The respective routine is illustrated in the flow chart of FIG. 26. The signal stored in the buffer is assumed to be in compressed format. The number of zero crossings between two limits containing an integer number of semi-cycles is what defines the frequency of the signal. Idle code and splitted semi-cycles first from the end of the buffer and then from the beginning of the buffer are removed. The effective length of the buffer is defined as the full length minus rejected samples at both ends of the buffer.

Figure 27:
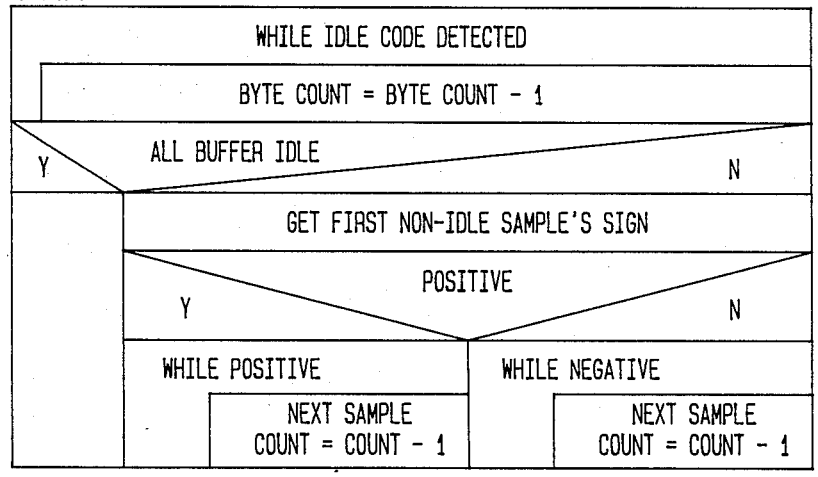

Starting with the end buffer address one interpreter subroutine FTRUNC is initiated and executed. This subroutine is shown in the flow chart of FIG. 27. The subroutine scans the start or, as currently referred to, the end of a buffer looking for idle code and the first zero crossing of the signal after end of idle code. A byte count, initially set to an amount equal to the entire buffer length is decremented until a zero crossing is found. Whenever the first sample containing other data than idle code is detected, the sign of this sample is obtained and stored. The subroutine is continued as long as the detected sign does not change. The mentioned byte count is further decremented until the sign changes again which indicates the first zero crossing.

Returning now to FIG. 26 after the subroutine has been executed, the calculating routine continues with a test if the buffer contains all idle code. If this is the case, immediately the result, the frequency magnitude zero, is obtained. Otherwise, the same subroutine FTRUNC as described above in conjunction with FIG. 27 is now applied to the begin of the buffer. The sign of the first semi-cycle is obtained and saved.

The routine continues with a loop which is run through continuously for the entire effective length of the buffer. During each run the sign bit of the sample is tested and compared to the previously saved sign bit. A change of the sign bit indicates the begin of a subsequent semi-cycle, thereupon a count for the number of semi-cycles detected is incremented by one. The loop is left when all samples from the buffer within the effective length area have been retrieved. Thereupon, the frequency is calculated in accordance with the given definitions for maximal signal frequency of 4000 Hz multiplied by the ratio of the number of detected semi-cycles and the effective length of the buffer.

Figure 28:
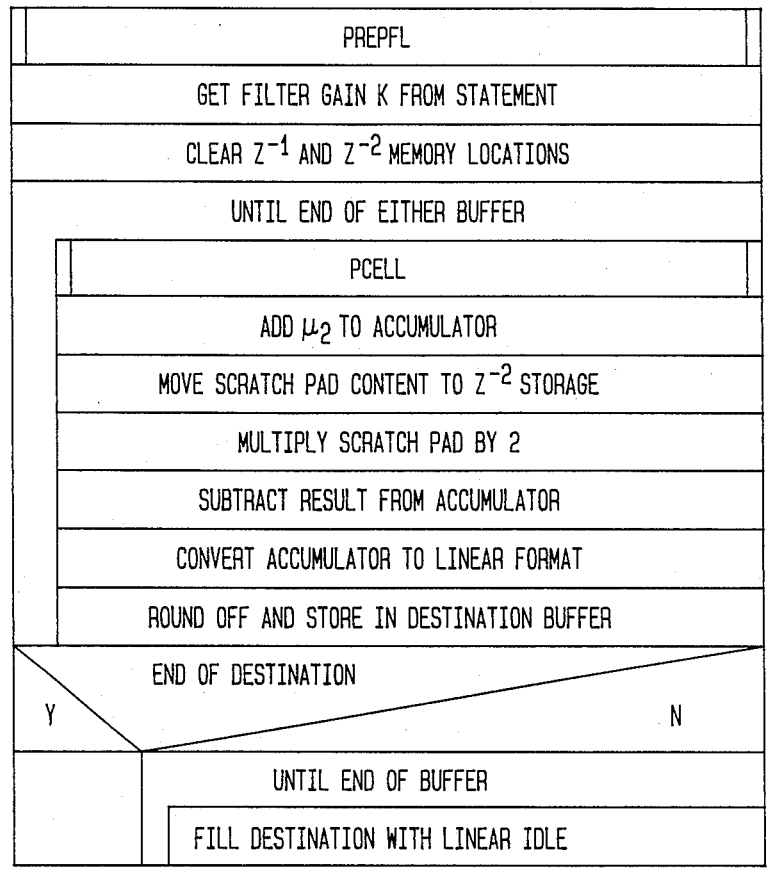
FIG. 28 shows a flow chart illustrating the implementation of a high pass digital filter.

Another unique feature of the high level signal processing language are the filter statements. Corresponding interpreter routines are provided in the IPTA interpreter module 1108. The filter statements as such and the accompanying parameters, such as destination buffer, source buffer, gain and filter coefficients have been described previously. As an example for a corresponding interpreter routine supporting a filter statement, the routine for implementing a high pass filter is shown in the flow chart of FIG. 28. The interpreter routine starts with a subroutine designated PREPFL and utilized for preparing filter parameters. The subroutine as such is a straight forward sequence of steps to obtain source and destination buffer numbers and the filter coefficients for saving the same in temporary locations.

Figure 30:
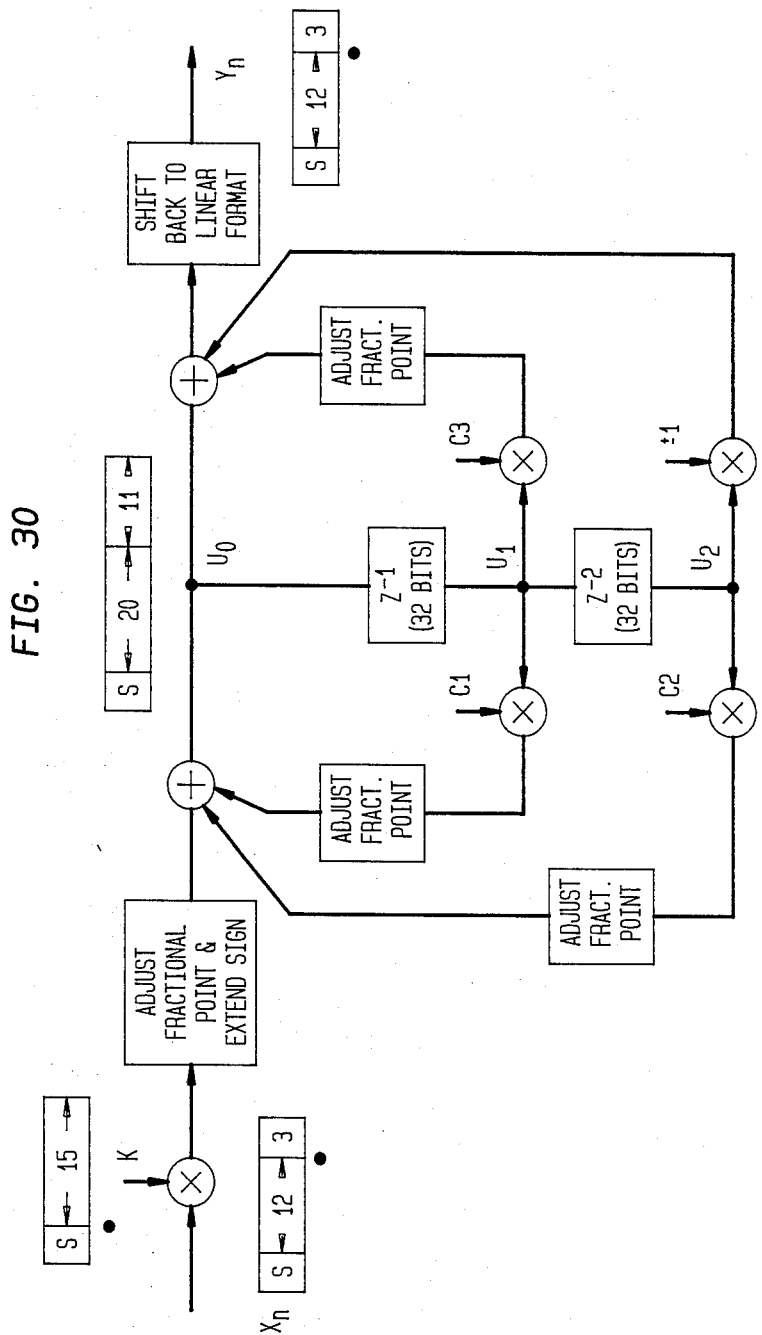
FIG. 30 shows a block diagram representing the implementation of a filter cell by means of a more conventional illustration.

Then the filter gain magnitude K from the filter statement is saved and temporary registers for saving intermediate values are cleared. At this time a subroutine FCELL which is an implementation of a filter cell applying to all filter statements is called. This subroutine is shown in FIG. 29 and its corresponding representation in a block diagram is represented in FIG. 30. Both representations, the flow chart and block diagram, in combination are essentially self-explanatory. This filter subroutine FCELL is a straight forward sequence of steps which implements the pole section of the second order filter. A linear sample is loaded from a source buffer and multiplied by the saved gain value K. The result is rounded off and the fraction is truncated from 18 to 11 bits, the sign is extended and a 32 bit result is moved to the accumulator of the IPTA processor 410. A first filter value $u_1$ is obtained and temporarily saved in a scratch pad register (not shown in FIG. 30). The value $u_1$ is multiplied by coefficient −C1 utilizing another subroutine FMULT and the result is multiplied by 2 by a means of a one step left shift. This intermediate value is truncated to 32 bits with 11 bits of fractionals. This result is added to the accumulator contents.

Thereupon, the intermediate value $u_2$ is retrieved and multiplied by coefficient −C2 and truncated to a 32 bit format whereby again subroutine FMULT is utilized. This intermediate result is added to the accumulator value to obtain the intermediate value $u_0$. This 32 bit intermediate value $u_0$ is loaded into the first memory location designated for storing the value $z^{-1}$.

Thereafter, returning now to FIG. 28 depending on the filter type and the corresponding transfer characteristic the intermediate value $u_2$ is added to or subtracted from accumulator contents $u_0$. Thereafter, the intermediate value $u_1$ is moved from a scratch pad register to the second memory location $z^{-2}$.

The next following step distinguishes the implementation of the notch filter from the other filters, the respective transfer characteristics may be compared to this reason. If the respective filter coefficient C3 is zero the next following steps are omitted. Otherwise, if C3 = +1 or −1, the intermediate value $u_1$ is multiplied by 2, or else multiplied by 2×C3. In accordance with the sign of the filter coefficient C3 the achieved result is added to or subtracted from the contents of the accumulator.

In any case, i.e. that is for all filter implementations, the current accumulator contents are rounded off and truncated to a 16 bit, 3 fractionals linear format and the resulting value is stored in the destination buffer. This loop starting with the subroutine FCLL is continued until the end of the defined destination area of the buffer. From then on the buffer is filled with linear idle code.

The described hardware, firmware and software structure of the PCM transmission analyzer allows for a variety of variations and modifications within the scope of the invention. The described testing unit may be implemented in form of a fully selfcontained subsystem wherein all available test arrays are loaded into a background memory residing within the subsystem. Such measure would eliminate the need for down-loading of test arrays from the common control of the digital telecommunication system to the testing subsystem. The communication between the subsystem and the remainder of the digital communication system concerning initiation of a test and test reports could be adjusted accordingly such that this subsystem may be understood as a fully independent testing equipment. Also the concept of the described high level signal processing language is expandable to allow for any additional statements, if desirable, for supporting further tests. The described modular approach for the hardware and software structure is flexible enough to allow for a variety of modifications if desirable in view of such extended set of statements. Many other changes, modifications, variations and other uses and applications of the subject invention will become apparent to those skilled in the art after considering the specification and the accompanying drawings. All such changes, adjustments and other uses and applications which do not depart from the spirit and the scope of the invention are deemed to be covered by the invention which is limited only by the claims which follow.

APPENDIX A

STATEMENTS OF HIGH LEVEL SIGNAL PROCESSING LANGUAGE

| OPCODE | FUNCTION |
| --- | --- |
| 00 | NOP |
| 01 | INPUT |
| 02 | INPUT AFTER IDLE |
| 03 | OUTPUT |
| 04 | INPUT WHILE OUTPUT |
| 05 | CALCULATE ON TIME |
| 06 | CALCULATE OFF TIME |
| 07 | WAIT |
| 08 | END TRANSFER |
| 09 | SYNCHRONIZE |
| 0A | LOOP |
| 0B | END LOOP |
| 0C | CALCULATE IMPULSE NOISE |
| 0D | |
| 0E | |
| 0F | |
| 10 | CALCULATE AVERAGE OF BUFFER |
| 11 | CALCULATE RMS OF BUFFER |
| 12 | CALCULATE FREQUENCY OF BUFFER |
| 13 | CALCULATE DIVISION OF REGISTERS |
| 14 | CALCULATE TWO'S COMPLEMENT OF REGISTER |
| 15 | CALCULATE ABSOLUTE OF REGISTER |
| 16 | CALCULATE SUM OF REGISTERS |
| 17 | CALCULATE MULTIPLICATION OF REGISTERS |
| 18 | CALCULATE SUM OF REGISTER AND DATA |
| 19 | CALCULATE DIFFERENCE OF REGISTERS |
| 1A | CALCULATE TRUE RMS OF A BUFFER |
| 1B | |
| 1C | |
| 1D | FILL BUFFER WITH TABLE |
| 1E | FILL BUFFER WITH SINE f=# P=# dBm=# |
| 1F | FILL BUFFER WITH SINE f=# P=# dBm=R |
| 20 | FILL BUFFER WITH SINE f=# P=R dBm=# |
| 21 | FILL BUFFER WITH SINE f=# P=R dBm=R |
| 22 | FILL BUFFER WITH SINE f=R P=# dBm=# |
| 23 | FILL BUFFER WITH SINE f=R P=# dBm=R |
| 24 | FILL BUFFER WITH SINE f=R P=R dBm=# |
| 25 | FILL BUFFER WITH SINE f=R P=R dBm=R |
| 26 | FILL BUFFER WITH DIGIT FROM TABLE |
| 27 | FILL BUFFER WITH SUM OF BUFFERS |
| 28 | FILL BUFFER WITH MULTIPLICATION OF BUFFERS |
| 29 | LINEARIZE BUFFER |
| 2A | COMPRESS BUFFER |
| 2B | RAMP UP BUFFER |
| 2C | RAMP DOWN BUFFER |
| 2D | MASK BUFFER |
| 2E | |
| 2F | |
| 30 | |
| 31 | LOAD REGISTER WITH TABLE |
| 32 | LOAD REGISTER WITH REGISTER |
| 33 | LOAD REGISTER WITH INDATA |
| 34 | LOAD REGISTER WITH CONSTANT |
| 35 | DEFINE TABLE |
| 36 | DEFINE BUFFER IN MS |
| 37 | DEFINE LINEAR BUFFER |
| 38 | DEFINE BUFFER AS (CONCATENATE) |
| 39 | IF BUFFER = TABLE |
| 3A | IF BUFFER = BUFFER |
| 3B | IF REG < NUMBER |
| 3C | IF REG = NUMBER |
| 3D | IF REG > NUMBER |
| 3E | IF REG ≦ NUMBER |
| 3F | IF REG ≧ NUMBER |
| 40 | IF REG < REG |
| 41 | IF REG = REG |
| 42 | IF REG > REG |
| 43 | IF REG ≦ REG |
| 44 | IF REG ≧ REG |
| 45 | IF LOWER BOUND < REG ≦ UPPER BOUND |
| 46 | FILTER LOW PASS |
| 47 | FILTER HIGH PASS |
| 48 | FILTER BAND PASS |
| 49 | FILTER NOTCH |

APPENDIX A-continued

STATEMENTS OF HIGH LEVEL SIGNAL PROCESSING LANGUAGE

| OPCODE | FUNCTION |
| --- | --- |
| 4A | TRANSFER |
| 4B | END TEST |
| 4C | CALL |
| 4D | GOTO |
| 4E | RETURN |
| 4F | |
| 50 | RESPOND PASS |
| 51 | RESPOND FAULT |
| 52 | RESPOND DIGITS |
| 53 | RESPOND REGISTER |

What is claimed is:

1. A transmission test arrangement for use with a digital telecommunication system, said system including a central switch having a common control unit including a system bus and controlled by said common control unit, a switching network, and a plurality of line interface units being internally connected to said switching network and each said line interface unit being adapted to be connected to a corresponding line circuit, said test arrangement for executing performance tests on devices of said telecommunication system and comprising:

a bus-oriented microprocessor system designed for synthesizing and analyzing test signals in accordance with a particular algorithm written in a particular signal processing language, including a processor bus, and, residing on said processor bus, a microprocessor, a program memory, a main memory and a first interface module;

said first interface module being connected to said system bus for receiving test control information specifying a test procedure from the common control unit and for transmitting test results to the common control unit;

said main memory and said program memory being designed for storing intermediate data and control information for executing a test, respectively; and a second interface module for providing an interface between a device of the telecommunication system and the bus-oriented microprocessor system, the second interface module being connected to a selected one of said line interface units for simulating an information source and sink, respectively with respect to one of said devices of the telecommunication system being temporarily linked to said selected line interface unit across the switching network under control of the common control unit, the particular algorithim written in the particular signal processing language permitting control of signal synthesis, signal analysis and signal processing functions of the transmission test arrangement, the transmission test arrangement operating in real time or off line under software control.

2. The transmission test arrangement as recited in claim 1, wherein the digital telecommunication system includes at least two groups of line interface units, first line interface units having an analog input/output port for connection to an analog line circuit, and second line interface units having a digital input/output port adapted to be connected to a line circuit of digital design, and wherein the second interface module of the transmission testing arrangement is connected to a selected one of said second line interface units.

3. The transmission test arrangement as recited in claim 2, wherein said microprocessor system is an input/output processing unit designed for receiving test requests and reporting test results across said first interface module, for initiating tests including synthesis of test signals to be transmitted during a test, and for analyzing signals received from a device under test; and wherein said second interface module comprises a further microprocessor system, in particular, a signal transfer processing unit operating under control of said input/output processing unit and executing signal transfers to and from the device under test across the line interface unit connected thereto.

4. The transmission test arrangement as recited in claim 3, wherein said signal transfer processing unit includes a signal transfer processing bus, and, residing on said signal transfer processing bus, a processing unit, a main memory, a program memory and a digital interface network being cross-connected to said selected one of said second line interface units.

5. The transmission test arrangement as recited in claim 4, wherein said input/output processing unit and said signal transfer processing unit each comprise a further interface device, each said further interface device residing on the respective bus of the input/output processing unit and the signal transfer processing unit and said further interface devices are cross-connected for providing data transfer between both processing units.

6. The transmission test arrangement as recited in claim 5, wherein said signal transfer processing unit being designed to utilize a dedicated area of main memory of the input/output processing system includes a memory decoder connected to receive a memory address across the signal transfer processing bus for decoding said memory address into an address of the signal transfer processing unit's main and program memories and said dedicated memory area, respectively; and wherein said memory decoder is connected to main and program memories of the signal transfer processing unit and across said two further interface devices to the microprocessor of the input/output processing unit for requesting access to said dedicated memory area by means of a direct memory access routine.

7. The transmission test arrangement as recited in claim 2, wherein the bus-oriented microprocessor system comprises storage means constructed in the form of buffers of predetermined lengths utilized for intermediately storing signal patterns in a manner corresponding to real-time processing conditions of the telecommunication system, whereby a buffer length reflects an actual time period based upon the assumption that the buffer during execution of a test is filled and emptied, respectively byte-by-byte with the sampling rate of the telecommunication system.

8. The transmission test arrangement as recited in claim 7, in conjunction with a telecommunication system operating on a sampling rate of 8 KHz, wherein said buffers each are identified by an individual buffer name and are further defined by an individual length variable expressed in milliseconds, said buffer name is interpreted by the microprocessor system into a microprocessor memory address of the first byte of the buffer and said length variable determines the number of subsequent bytes of the storage area allocated to said buffer and eight bytes of memory correspond to one millisecond of a time interval.

9. The transmission test arrangement as recited in claim 7, wherein said microprocessor system being designed to operate under software control based upon test programs of the particular algorithm represented in the particular signal processing language, in particular, a high level language, translated by compiler into data base and each test program providing an individual test array constituting the sum of statements describing a test, includes:
- means for controlling input/output operations in order to receive a test array and report test results, respectively;
- means for interpreting the statements of the test array received in order to define buffers, tables and registers required for executing the respective test by allocating corresponding memory areas thereto and to generate an operational code for executing the corresponding statement, respectively; and
- means for executing operational codes supplied by said interpreting means for providing signal synthesis and signal analysis, respectively in accordance with parameters and variables defined in the respective test program, said executing means being furthermore designed to transfer control to the signal transfer processing unit for activating the signal transfer processing unit to actually transfer test signals under real-time conditions.

10. The transmission test arrangement as recited in claim 2, wherein said microprocessor system for synthesizing test signals includes means for generating signals of frequency sinusoids with a predetermined power level, said signals being represented in a linear digital format of at least twelve bits plus a sign bit and means for transforming said linear signal representations into a companded format in accordance with A law and Mu law, respectively.

11. The transmission test arrangement as recited in claim 10, wherein said signal generating means are designed to include sinusoidal signals of a frequency up to at least 4 KHz with a power level to be selected in the range from −60 dbm to at least 3.1 dbm.

12. The transmission test arrangement as recited in claim 11, wherein said signal generating means are designed to generate modulated signals out of any combination of those sinusoidal signals.

13. The transmission test arrangement as recited in claim 12, wherein said signal generating means include means for generating pulsed tones and pulsed tone combinations, respectively with predetermined pulse widths and idle tone intervals to be set in steps of one millisecond each.

14. The transmission test arrangement as recited in claim 13, wherein said means for generating pulsed tones and pulsed tone combinations include means for generating linear ramps at rise and fall of each pulse edge.

15. The transmission test arrangement as recited in claim 14, wherein said signal generating means are furthermore designed to generate a sequence of pulse code modulated (PCM) code words commonly representing all possible digit combinations of samples transmitted within said telecommunication system.

16. The transmission test arrangement as recited in claim 2, wherein the microprocessor system for analyzing signals received by the test arrangement from a device under test comprises means for filtering said signals received, said filter means implementing digital filters including band pass, high pass, low pass and notch filters; and means for digitally measuring the power level of said signals received.

17. The transmission test arrangement as recited in claim 16, wherein said filter means are designed to provide said filter types with presettable characteristics by means of individually specified filter parameters.

18. The transmission test arrangement as recited in claim 2, the microprocessor system for analyzing signals received further comprising means for analyzing envelopes of tone pulses including measurements of pulse period, duty cycle and rise and fall times of pulse edges.

19. The transmission test arrangement as recited in claim 18, in conjunction with a telecommunication system providing a specific pulse code word for representing an idle tone sample, wherein said envelope analyzing means further include means for recognizing the pulse code word representing idle tone.

20. The transmission test arrangement as recited in claim 2, wherein the microprocessor system for analyzing said signals received further comprises means for comparing measured values of said signals received to conditional parameter values specified for the respective test.

21. The transmission test arrangement as recited in claim 20, wherein the said comparison means are further designed to provide comparison of a signal received to a reference signal on a byte-by-byte basis.

22. The transmission test arrangement as recited in claim 9, wherein the second interface module is designed to be connected in parallel to a plurality of said second line interface units each providing a separate transmission path to a selected device under test whereby a plurality of tests can be run simultaneously.

23. The transmission test arrangement as recited in claim 22, wherein, in order to provide for interleaving of simultaneously performed tests, said means for executing operational codes include means for controlling the course of a test by means of continuously assigning a respective test state to each specific line interface unit connected to the test arrangement in such a manner that each test state is associated with a specific type of operation of the microprocessor system and only specific sequences of states are made possible in dependence upon the progress of the respective test and the test states of the remaining line interface units.

24. The transmission test arrangement as recited in claim 23, wherein a normal sequence of said test states includes in consecutive order:
- an idle state representing the respective line interface unit being available for assigning a new test;
- a start state representing the active condition of said means controlling input/output operations;
- an active state being assumed when the microprocessor system is performing signal synthesis and analysis, respectively;
- a suspended state representing actual transfer of test data to and from the device under test by means of said second interface module;
- a wait state representing completion of test data transfer prior to signal analysis and being terminated by a return to said active state for signal analysis;
- a completed state representing the course of a test when test results including test failures are available to be sent out, said state being terminated after reporting test results by return to idle state; and wherein furthermore a conditional transition from suspended state to completed state takes place in case of a detected failure with respect to input/output operations across the respective line interface unit.

25. The transmission test arrangement as recited in claim 1, wherein the common control of the telecommunication system is a bus-oriented central processing system having a system bus and including input/output processing modules each forming a sub-system of the common control unit and wherein said first interface module comprises an interface unit connected to said system bus, whereby the transmission test arrangement constitutes a sub-system of said common control unit.

26. The transmission test arrangement as recited in claim 24, wherein the testing arrangement shares a common central memory area with said central processing system and has access to this common central memory area by means of a direct memory access routine whereby test arrays are down-loaded from common control to the test arrangement.

27. The transmission test arrangement as recited in claim 25, in conjunction with the common control unit further including a stand-by central processing system for redundancy, wherein said first interface module is duplicated in said microprocessor system in order to provide separate interface means to both central processing systems, whereby the test arrangement constitutes a sub-system alternatively utilized by either one of the central processing systems.

* * * * *